United States Patent
Nagamine et al.

(10) Patent No.: US 9,616,883 B2
(45) Date of Patent: Apr. 11, 2017

(54) HYBRID VEHICLE

(71) Applicants: Nissan Motor Co., Ltd., Yokohama-shi, Kanagawa (JP); JATCO LTD, Fuji-shi, Shizuoka (JP)

(72) Inventors: Morihiro Nagamine, Tokyo (JP); Akira Takano, Atsugi (JP); Shintaro Oshio, Sagamihara (JP); Takuro Hirano, Gotemba (JP); Yoshihisa Kodama, Sagamihara (JP); Akihiro Yamamoto, Hiratsuka (JP)

(73) Assignees: Nissan Motor Co., Ltd., Yokohama (JP); JATCO LTD, Fuji-shi (JP)

( * ) Notice: Subject to any disclaimer, the term of this patent is extended or adjusted under 35 U.S.C. 154(b) by 26 days.

(21) Appl. No.: 14/770,485

(22) PCT Filed: Mar. 14, 2014

(86) PCT No.: PCT/JP2014/056871
§ 371 (c)(1),
(2) Date: Aug. 26, 2015

(87) PCT Pub. No.: WO2014/148376
PCT Pub. Date: Sep. 25, 2014

(65) Prior Publication Data
US 2016/0009273 A1    Jan. 14, 2016

(30) Foreign Application Priority Data

Mar. 21, 2013   (JP) ................. 2013-057519

(51) Int. Cl.
*B60W 10/02*   (2006.01)
*B60W 10/10*   (2012.01)
(Continued)

(52) U.S. Cl.
CPC ............. *B60W 20/40* (2013.01); *B60K 6/48* (2013.01); *B60K 6/543* (2013.01); *B60L 1/003* (2013.01); *B60L 7/14* (2013.01); *B60L 11/14* (2013.01); *B60L 15/2009* (2013.01); *B60L 15/2054* (2013.01); *B60W 10/02* (2013.01); *B60W 10/06* (2013.01); *B60W 10/107* (2013.01); *F16H 61/0031* (2013.01); *F16H 61/66272* (2013.01);
(Continued)

(58) Field of Classification Search
CPC .......... F16H 61/0031; F16H 61/66272; F16H 2312/14; B60W 10/02; B60W 10/10
See application file for complete search history.

(56) References Cited

U.S. PATENT DOCUMENTS

2009/0236159 A1*  9/2009  Shibata .............. B60K 6/445
                                                180/65.235
2011/0224879 A1*  9/2011  Waku ................. F16H 61/0031
                                                701/67

FOREIGN PATENT DOCUMENTS

EP     1 116 619 A2    7/2001
JP     H11-132321 A    5/1999
(Continued)

*Primary Examiner* — Bryan Evans
(74) *Attorney, Agent, or Firm* — Global IP Councelors, LLP

(57) ABSTRACT

A hybrid vehicle includes a mechanical oil pump that is driven by an engine and an electric oil pump that is driven by an electric motor, and is configured to activate the electric oil pump when traveling in an electric traveling mode, in which the engine is stopped and traveling is executed by a driving force from a driving motor.

19 Claims, 18 Drawing Sheets

(51) Int. Cl.
*B60W 20/40* (2016.01)
*B60K 6/48* (2007.10)
*B60K 6/543* (2007.10)
*B60L 11/14* (2006.01)
*B60L 1/00* (2006.01)
*B60L 7/14* (2006.01)
*B60L 15/20* (2006.01)
*F16H 61/00* (2006.01)
*B60W 10/06* (2006.01)
*B60W 10/107* (2012.01)
*F16H 61/662* (2006.01)

(52) U.S. Cl.
CPC ... *B60K 2006/4808* (2013.01); *B60L 2240/12* (2013.01); *B60L 2240/507* (2013.01); *B60L 2250/26* (2013.01); *B60L 2270/145* (2013.01); *F16H 2061/66286* (2013.01); *Y02T 10/626* (2013.01); *Y02T 10/6221* (2013.01); *Y02T 10/645* (2013.01); *Y02T 10/70* (2013.01); *Y02T 10/7077* (2013.01); *Y02T 10/72* (2013.01); *Y02T 10/7275* (2013.01); *Y10S 903/945* (2013.01)

(56) References Cited

FOREIGN PATENT DOCUMENTS

| | | |
|---|---|---|
| JP | 2000-199442 A | 7/2000 |
| JP | 2000-230442 A | 8/2000 |
| JP | 2011-208689 A | 10/2011 |
| JP | 2012-250602 A | 12/2012 |

\* cited by examiner

| | L/B | H/C | R/B |
|---|---|---|---|
| FIRST SPEED | O | × | × |
| SECOND SPEED | × | O | × |
| REVERSE | × | × | O |
| NEUTRAL | × | × | × |

HYBRID VEHICLE

CROSS-REFERENCE TO RELATED APPLICATIONS

This application is a U.S. National stage application of International Application No. PCT/JP2014/056871, filed Mar. 14, 2014, which claims priority to Japanese No. 2013-057519 filed in Japan on Mar. 21, 2013, the contents of each of which is hereby incorporated herein by reference.

BACKGROUND

Field of the Invention

The present invention relates to a hybrid vehicle that is equipped with an engine and an electric motor as power sources and that is capable of selecting between an electric traveling mode (EV mode) that travels only by an electric motor and a hybrid traveling mode (HEV mode) that travels by the electric motor and the engine.

Background Information

For example, a hybrid vehicle such as that disclosed in Japanese Laid-Open Patent Application No. 2000-199442 has been known. In this hybrid vehicle, the engine is detachably coupled with driving wheels sequentially via a continuously variable transmission and a clutch, and an electric motor is constantly coupled with the driving wheels. The hybrid vehicle further comprises a mechanical oil pump that is driven by the engine and that supplies oil to the continuously variable transmission and the clutch.

This hybrid vehicle is capable of electric travel (EV travel) in the EV mode via only the electric motor by stopping the engine, as well as by releasing the clutch described above, and is capable of hybrid travel (HEV travel) in the HEV mode via the electric motor and the motor by starting the engine, as well as by engaging the clutch.

Since the engine and the continuously variable transmission are disconnected from the driving wheels by releasing the clutch during EV traveling, the friction of the engine and the continuously variable transmission can be reduced during EV travel.

SUMMARY

In the conventional technology described above, the mechanical oil pump will stop as the engine is stopped.

When hydraulic pressure is not supplied, the transmission ratio of the continuously variable transmission is automatically shifted to the low side (hereinafter referred to as low return). When the EV mode is switched to the HEV mode during or after an occurrence of this low return, the possibility that the rotational speed of the clutch on the continuously variable transmission side will be lower than the rotational speed of the clutch on the driving wheel side when engaging the clutch increases as the vehicle speed when engaging the clutch increases, as compared to instances when there is no low return. When the clutch is engaged in this state, the driving wheel-side rotational speed is lowered accompanying the engagement of the clutch, and the driver will feel a drag shock.

In light of the problem described above, an object of the present invention is to provide a hybrid vehicle that is capable of stably switching to the HEV mode from the EV mode while traveling.

For this purpose, the hybrid vehicle according to the present invention is configured to maintain the transmission ratio of the continuously variable transmission when the driving wheels are being driven or subjected to regenerative braking by the driving motor, the engine is stopped, and the clutch between the driving wheels and the continuously variable transmission is released.

Even when the mechanical oil pump is stopped when traveling in the electric traveling mode, suppressing a low return with a transmission ratio maintaining means or device becomes possible, and the drag shock accompanying an engagement of the clutch can be suppressed.

BRIEF DESCRIPTION OF THE DRAWINGS

Referring now to the attached drawings which form a part of this original disclosure.

FIG. 2A is a schematic system view illustrating the drive system of the hybrid vehicle and the overall control system thereof, and FIG. 2B is a clutch engagement logic diagram in a sub-transmission that is built in a V-belt-type continuously variable transmission in a drive system of the hybrid vehicle.

DETAILED DESCRIPTION OF THE EMBODIMENTS

Embodiment 1

Figure 1:
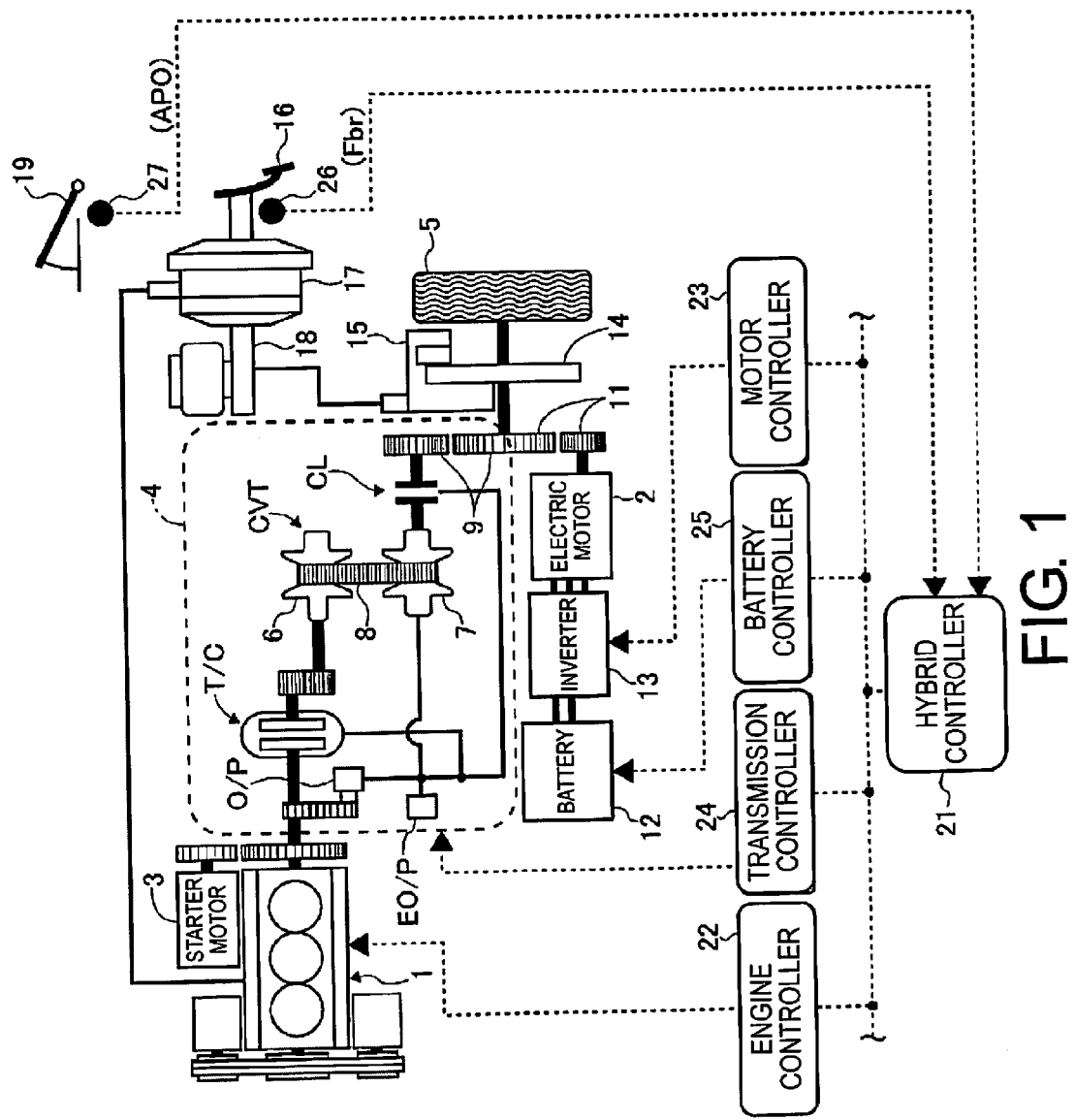
FIG. 1 is a schematic system view illustrating the drive system of the hybrid vehicle and the overall control system thereof of a first embodiment.

FIG. 1 is a schematic system view illustrating the drive system of the hybrid vehicle and the overall control system thereof of the first embodiment. The hybrid vehicle in FIG. 1 is equipped with an engine 1 and an electric motor 2 as the power source, and the engine 1 is started by a starter motor 3. The engine 1 is drivably coupled to the driving wheels 5 via a V-belt-type continuously variable transmission 4 that is capable of being appropriately detachable.

The variator CVT of the continuously variable transmission 4 is a V-belt-type continuously variable transmission comprising a primary pulley 6, a secondary pulley 7, and a V-belt 8 (endless flexible member) that bridges these pulleys 6, 7. A configuration to bundle a plurality of elements by an endless belt was employed for the V-belt 8, but the configuration is not particularly limited; for example, the chain method or the like may be employed. The primary pulley 6 is coupled to a crankshaft of the engine 1 via a torque converter T/C, and the secondary pulley 7 is coupled to the driving wheels 5 sequentially via a clutch CL and a final gear set 9. In the present embodiment, elements for connecting/disconnecting the power transmission path (clutches and brakes, etc.) are collectively described as the clutch. FIG. 1 conceptually illustrates the power transmission path; the high clutch H/C, the reverse brake R/B, and the low brake L/B disposed in the sub-transmission 31 are collectively described as the clutch CL. When the clutch CL is engaged, power from the engine 1 is input to the primary pulley 6 via the torque converter T/C; reaches the driving wheels 5 via the V-belt 8, the secondary pulley 7, the clutch CL, and the final gear set 9 sequentially; and is used for running the hybrid vehicle.

During engine power transmission, the winding arc diameter of the V-belt 8 with the primary pulley 6 is increased at the same time as decreasing the winding arc diameter with the secondary pulley 7 by decreasing the pulley V groove width of the primary pulley 6 and increasing the pulley V groove width of the secondary pulley 7. The variator CVT thereby upshifts to the high-side pulley ratio (high-side transmission ratio). When upshifting to the high-side transmission ratio is performed to the limit, the transmission ratio is set to the maximum transmission ratio.

Conversely, the winding arc diameter of the V-belt 8 with the primary pulley 6 is decreased at the same time as increasing the winding arc diameter with the secondary pulley 7 by increasing the pulley V groove width of the primary pulley 6 and decreasing the pulley V groove width of the secondary pulley 7. The variator CVT thereby downshifts to the low-side pulley ratio (low-side transmission ratio). When downshifting to the low-side transmission ratio is performed to the limit, the transmission ratio is set to the minimum transmission ratio.

The variator CVT comprises a primary rotational speed sensor 6a for detecting the rotational speed of the primary pulley 6, as well as a secondary rotational speed sensor 7a for detecting the rotational speed of the secondary pulley 7, and calculates the actual transmission ratio based on the rotational speeds detected by these two rotational speed sensors; the hydraulic control, etc. of each pulley is performed so that this actual transmission ratio will become the target transmission ratio.

An electric motor 2 is constantly coupled to the driving wheels 5 via a final gear set 11, and this electric motor 2 is driven via an inverter 13 by power from a battery 12. The inverter 13 provides DC power from the battery 12 to the electric motor 2 after converting this power to AC power and controls the drive force and the rotational direction of the electric motor 2 by adjusting the power supplied to the electric motor 2. In addition to the motor driving described above, the electric motor 2 also functions as a generator, which is also provided for use in regenerative braking. During this regenerative braking, the inverter 13 causes the electric motor 2 to act as a generator by applying a generator load for regenerative braking to the electric motor 2 and stores the electric power generated by the electric motor 2 in the battery 12.

In the hybrid vehicle of the first embodiment, only the power of the electric motor 2 reaches the driving wheels 5 via the final gear set 11 by driving or regenerating the electric motor 2 in a state in which the clutch CL is released and the engine 1 is stopped in order to travel in an electric traveling mode (EV mode) with only the electric motor 2. During this time, the friction of the engine 1 in a stopped state and the variator CVT is reduced, and wasteful power consumption during EV traveling is suppressed by having the clutch CL released.

In the EV traveling state described above, if the clutch CL is engaged at the same time as starting the engine 1 with the starter motor 3, the power from the engine 1 will reach the driving wheels 5 sequentially via the torque converter T/C, the primary pulley 6, the V-belt 8, the secondary pulley 7, the clutch CL, and the final gear set 9; thus, the hybrid vehicle will travel in a hybrid traveling mode (HEV mode) via the engine 1 and the electric motor 2.

When stopping the hybrid vehicle from traveling in the above-described traveling state or to maintain this stopped state, the aim is achieved by clamping and braking a brake disk 14 that rotates with the driving wheels 5 with a caliper 15. The caliper 15 is connected to a master cylinder 18 that outputs a brake fluid pressure, which corresponds to the brake pedal stepping force under boost by a negative pressure-type brake booster 17, in response to the stepping force on a brake pedal 16 on which a driver steps. The braking of the brake disk 14 is carried out by actuating the caliper 15 with the brake fluid pressure that is generated by the master cylinder 18. In both the EV mode and the HEV mode, the wheels 5 are driven by a torque corresponding to a drive force command, which is issued when the driver steps on an accelerator pedal 19, and the hybrid vehicle is made to travel with a drive force corresponding to the needs of the driver.

The hybrid controller 21 executes a traveling mode selection of the hybrid vehicle, the output control of the engine 1, the rotational direction control and the output control of the electric motor 2, the shift control of the variator CVT, the transmission control of the sub-transmission 31, the engagement and disengagement control of the clutch CL, and the charge/discharge control of the battery 12. To do this, the hybrid controller 21 carries out these controls via a corresponding engine controller 22, a motor controller 23, a transmission controller 24, and a battery controller 25.

A signal from a brake switch 26, which is a normally on switch that is switched from OFF to ON when braking by stepping on the brake pedal 16, and a signal from an accelerator opening sensor 27, which detects the accelerator pedal depression amount (accelerator opening) APO, are input to the hybrid controller 21. The hybrid controller 21 further exchanges internal information among the engine controller 22, the motor controller 23, the transmission controller 24, and the battery controller 25.

The engine controller 22 controls the output of the engine 1 in response to a command from the hybrid controller 21, and the motor controller 23 controls the rotational direction and the output of the electric motor 2 via the inverter 13 in response to a command from the hybrid controller 21. The transmission controller 24 performs transmission control of the variator CVT (V-belt-type continuously variable transmission CVT), transmission control of the sub-transmission 31, and the engagement/disengagement of the clutch CL, with oil from an engine-driven mechanical oil pump O/P (or an electric oil pump EO/P that is driven by a pump motor) as a medium, in response to a command from the hybrid controller 21. The battery controller 25 controls the charging/discharging of the battery 12 in response to a command from the hybrid controller 21.

Figures 2A, 2B:
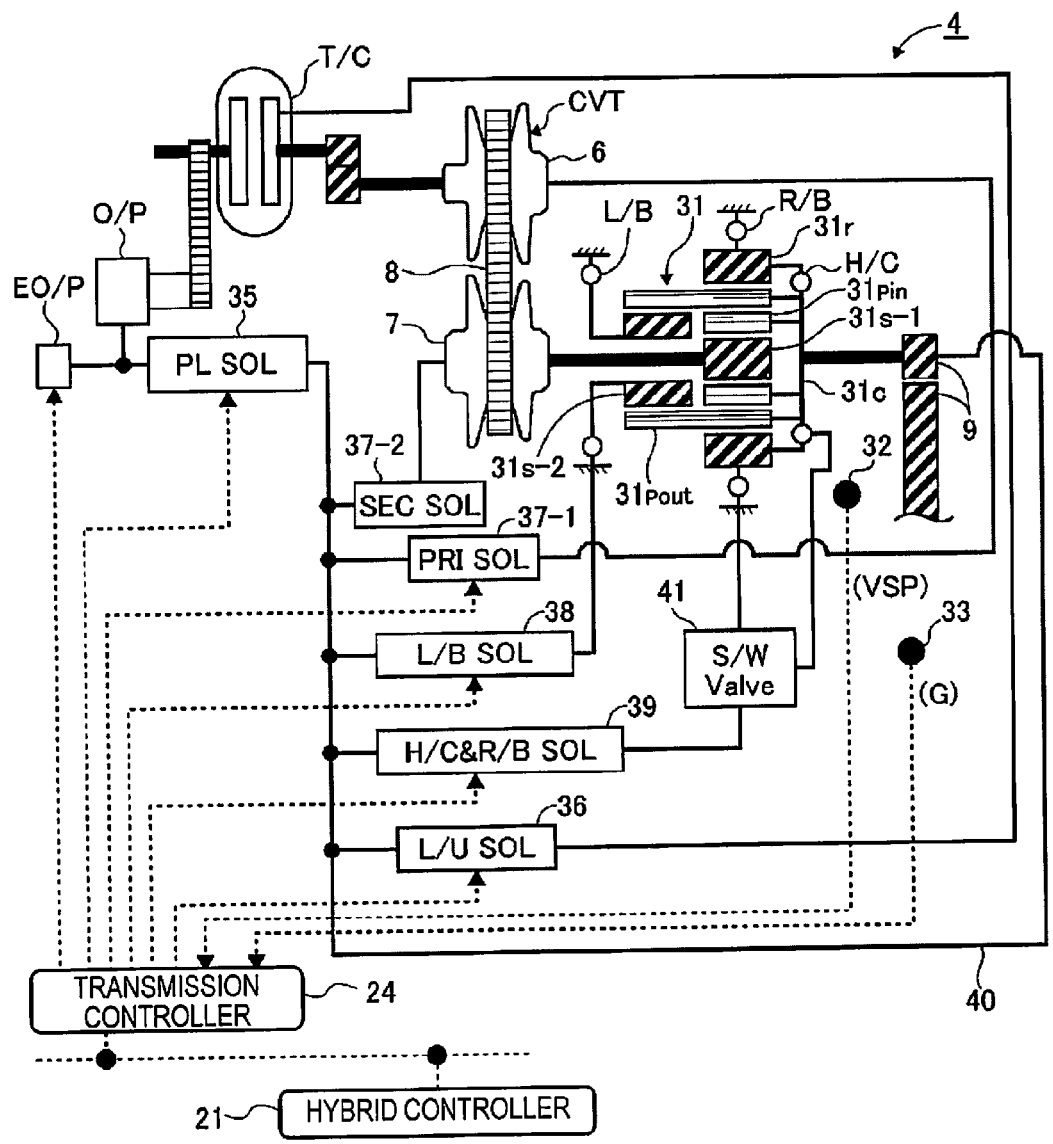
FIGS. 2A and 2B show the hybrid vehicle of the first embodiment.

FIG. 2A is a schematic system view illustrating the drive system of the hybrid vehicle of the first embodiment and the overall control system thereof; FIG. 2B is a clutch CL (specifically, H/C, R/B, L/B) engagement logic diagram in a sub-transmission 31 that is built in a continuously variable transmission 4 in a drive system of the hybrid vehicle of the first embodiment. The sub-transmission 31 is configured from a Ravigneaux planetary gear set, comprising composite sun gears 31s-1 and 31s-2, an inner pinion 31p in, an outer pinion 31p out, a ring gear 31r, and a carrier 31c that rotatably supports the pinions 31p in, 31p out, as illustrated in FIG. 2A.

Of the composite sun gears 31s-1 and 31s-2, the sun gear 31s-1 is connected to the secondary pulley 7 so as to act as an input rotation member, and the sun gear 31s-2 is disposed coaxially with respect to the secondary pulley 7 and is capable of being freely rotated.

The inner pinion 31p in meshes with the sun gear 31s-1, and this inner pinion 31p in and the sun gear 31s-2 both mesh with the outer pinion 31p out. The outer pinion 31p out meshes with the inner periphery of the ring gear 31r and then connects with the final gear set 9 so as to cause the carrier 31c to act as an output rotation member. The carrier 31c and the ring gear 31r are configured to be appropriately connectable by the high clutch H/C, which is a clutch CL; the ring gear 31r is configured to be appropriately connectable by the reverse brake R/B, which is a clutch CL; and the sun gear 31s-2 is configured to be appropriately connectable by the low brake L/B, which is a clutch CL.

The sub-transmission 31 is capable of selecting the gear shift stages of forward first speed, second speed, and reverse by engaging the high clutch H/C, the reverse brake R/B, and the low brake L/B in the combination illustrated by the ○ mark in FIG. 2B and releasing the rest as illustrated by the x mark in FIG. 2B. If all of the high clutch H/C, the reverse brake R/B and the low brake L/B are released, the sub-transmission 31 is in a neutral state that does not perform power transmission; if the low brake L/B is engaged in this state, the sub-transmission 31 will be in a forward first speed selected (deceleration) state; if the high clutch H/C is engaged, the sub-transmission 31 will be in a forward second speed selected (direct connection) state; and if the reverse brake R/B is engaged, the sub-transmission 31 will be in a reverse selected (reverse) state.

The continuously variable transmission 4 in FIG. 2A is capable of detaching the variator CVT (secondary pulley 7) and the driving wheels 5 by releasing all of the clutches CL (H/C, R/B, L/B) to put the sub-transmission 31 in the neutral state.

The continuously variable transmission 4 in FIG. 2A is controlled with oil from an engine-driven mechanical oil pump O/P or an electric oil pump EO/P that is driven by a pump motor as a working medium; the transmission controller 24 controls the control of the variator CVT in the following manner via a line pressure solenoid 35, a lock-up solenoid 36, a primary pulley pressure solenoid 37-1, a secondary pulley pressure solenoid 37-2, a low brake pressure solenoid 38, a high clutch pressure and reverse brake pressure solenoid 39, and a switch valve 41. In addition to the signals described above for FIG. 1, a signal from a vehicle speed sensor 32 for detecting the vehicle speed VSP and a signal from an acceleration sensor 33 for detecting the vehicle acceleration/deceleration G are input into the transmission controller 24.

The line pressure solenoid 35 regulates the pressure of the oil from the mechanical oil pump O/P to a line pressure PL, corresponding to the required driving force of the vehicle, in response to a command from the transmission controller 24. Additionally, an electric oil pump EO/P is connected between the mechanical oil pump O/P and the line pressure solenoid 35, which supplies a pump discharge pressure in response to a command from the transmission controller 24.

The lock-up solenoid 36 puts the torque converter T/C in a lock-up state in which the input/output elements are directly connected when needed by appropriately directing the line pressure PL to the torque converter T/C in response to a lock-up command from the transmission controller 24.

The primary pulley pressure solenoid 37-1 regulates the line pressure PL to the primary pulley pressure in response to a CVT transmission ratio command from the transmission controller 24 and supplies this to the primary pulley 6, thereby realizing the CVT transmission ratio command from the transmission controller 24 by controlling the V groove width of the primary pulley 6 and the V groove width of the secondary pulley 7 so that the CVT transmission ratio matches the command from the transmission controller 24. The secondary pulley pressure solenoid 37-2 regulates the line pressure PL to the secondary pulley pressure in response to a clamping force command from the transmission controller 24 and supplies this to the secondary pulley 7; the secondary pulley 7 thereby clamps the V-belt 8 to prevent slipping. When the transmission controller 24 emits a first speed selection command from the sub-transmission 31, the low brake pressure solenoid 38 supplies the line pressure PL to the low brake LB as the low brake pressure and engages this in order to realize the first speed selection command. When the transmission controller 24 emits a second speed selection command or the reverse selection command from the sub-transmission 31, the high clutch pressure and the reverse brake pressure solenoid 39 supplies the line pressure PL to the switch valve 41 as the high clutch pressure and reverse brake pressure.

The maximum discharge capacity of the electric oil pump EO/P of the first embodiment is set to be smaller, as compared to that of the mechanical oil pump O/P and does not have the discharge capacity to shift the gears of the variator CVT; downsizing the motor and the pump of the electric oil pump EO/P is achieved by ensuring a discharge capacity of a level that maintains the transmission ratio or a discharge capacity of a level that supplies lubricating oil.

At the time of the second speed selection command, the second speed selection command of the sub-transmission 31 is realized with the switch valve 41 directing the line pressure PL from the solenoid 39 to the high clutch H/C as the high clutch pressure and engaging the same. At the time of the second speed selection command, the reverse selection command of the sub-transmission 31 is realized with the switch valve 41 directing the line pressure PL from the solenoid 39 to the reverse brake R/B as the reverse brake pressure and engaging the same.

Regarding the Transmission Control Operation

Figure 3:
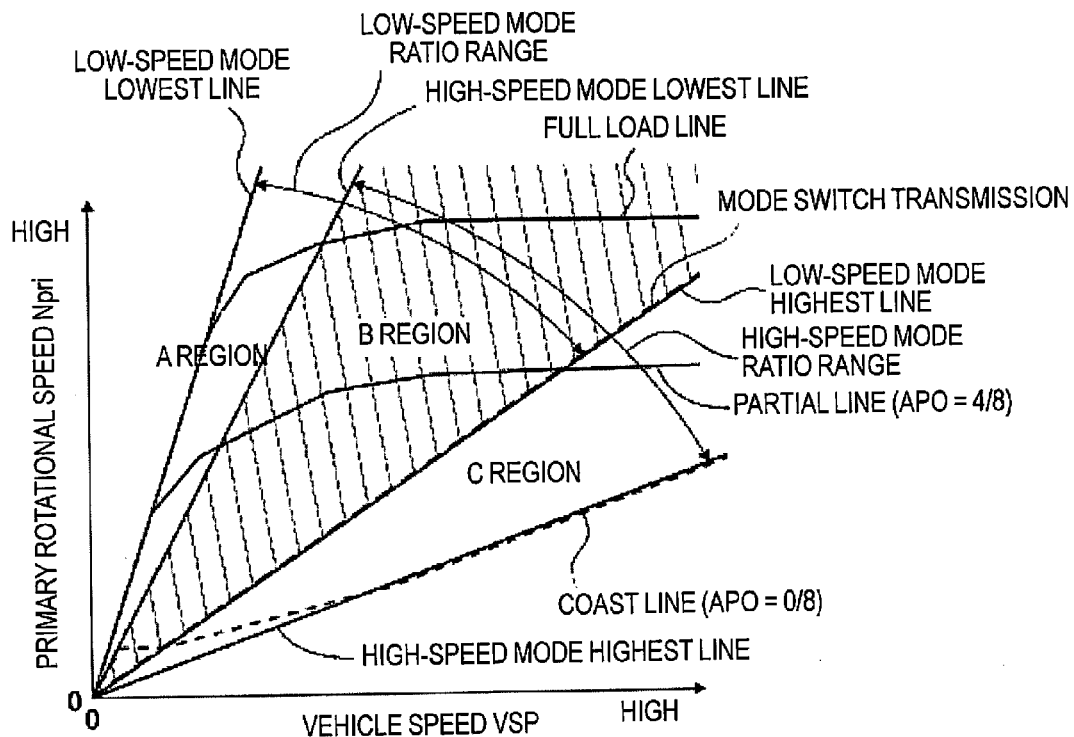
FIG. 3 is an example of a shifting map that is stored in the transmission controller of the first embodiment.

The transmission control operation will be explained next. FIG. 3 is an example of a shifting map that is stored in the transmission controller 24 of the first embodiment. The transmission controller 24 controls the continuously variable transmission 4 according to the driving state of the vehicle (the vehicle speed VSP, a primary rotational speed Npri, and the acceleration opening amount APO in the first embodiment) with reference to this shifting map. In this shifting map, the operating point of the continuously variable transmission 4 is defined by the vehicle speed VSP and the primary rotational speed Npri. The slope of the line that connects the operating point of the continuously variable transmission 4 and the zero point at the bottom left corner of the shifting map corresponds to the transmission ratio of the continuously variable transmission 4 (the overall transmission ratio obtained by multiplying the transmission ratio of the sub-transmission 31 by the transmission ratio of the variator CVT, hereinafter referred to as the "through transmission ratio").

A shift line is set for each acceleration opening amount APO in this shifting map in the same way as in a shifting map for a conventional belt-type continuously variable transmission; shifting the continuously variable transmission 4 is performed according to the shift line selected based on the acceleration opening amount APO. For the sake of simplicity, FIG. 3 only illustrates the full load line (the shift line when the acceleration opening amount APO=8/8), the partial line (the shift line when the acceleration opening amount APO=4/8), and the coast line (the shift line when the acceleration opening amount APO=0/8).

When the continuously variable transmission 4 is in the low-speed mode, the continuously variable transmission 4 is capable of shifting between a low-speed mode lowest line, which is obtained by setting the transmission ratio of the variator CVT to the lowest transmission ratio, and a low-speed mode highest line, which is obtained by setting the transmission ratio of the variator CVT to the highest transmission ratio. At this time, the operating point of the continuously variable transmission 4 moves in the A region and the B region. On the other hand, when the continuously variable transmission 4 is in the high-speed mode, the continuously variable transmission 4 is capable of shifting between a high-speed mode lowest line, which is obtained by setting the transmission ratio of the variator CVT to the lowest transmission ratio, and a high-speed mode highest line, which is obtained by setting the transmission ratio of the variator CVT to the highest transmission ratio. At this time, the operating point of the continuously variable transmission 4 moves in the B region and the C region.

The transmission ratio of each gear shift stage of the sub-transmission 31 is set so that the transmission ratio corresponding to the low-speed mode highest line (low-speed mode highest transmission ratio) will be smaller than the transmission ratio that corresponds to the high-speed mode lowest line (high-speed mode lowest transmission ratio). The range of the through transmission ratio of the continuously variable transmission 4 that can be taken in the low-speed mode ("low-speed mode ratio range" in the drawing) and the range of the through transmission ratio of the continuously variable transmission 4 that can be taken in the high-speed mode ("high-speed mode ratio range" in the drawing) thereby partially overlap; when the operating point of the continuously variable transmission 4 is in the B range that is sandwiched between the high-speed mode lowest line and the low-speed mode highest line, the continuously variable transmission 4 is capable of selecting both the low-speed mode and the high-speed mode.

In addition, the mode switching shift line for shifting the sub-transmission 31 is set to overlap on the low-speed mode highest line on this shifting map. The through transmission ratio that corresponds to the mode switching shift line (hereinafter referred to as "mode switching transmission ratio mRatio") is set to be a value equal to the low-speed mode highest transmission ratio. The reason for setting the mode switching shift line in this way is that the input torque to the sub-transmission 31 is decreased as the transmission ratio of the variator CVT decreases; as a result, the shift shock when shifting the sub-transmission 31 can be suppressed.

Then, when the operating point of the continuously variable transmission 4 crosses the mode switching shift line, that is, when the actual value of the through transmission ratio changes across the mode switching transmission ratio mRatio, the transmission controller 24 performs a coordinated shift with both the variator CVT and the sub-transmission 31 in order to switch between the high-speed mode and the low-speed mode.

Regarding the Mode Switching Control

Figure 4:
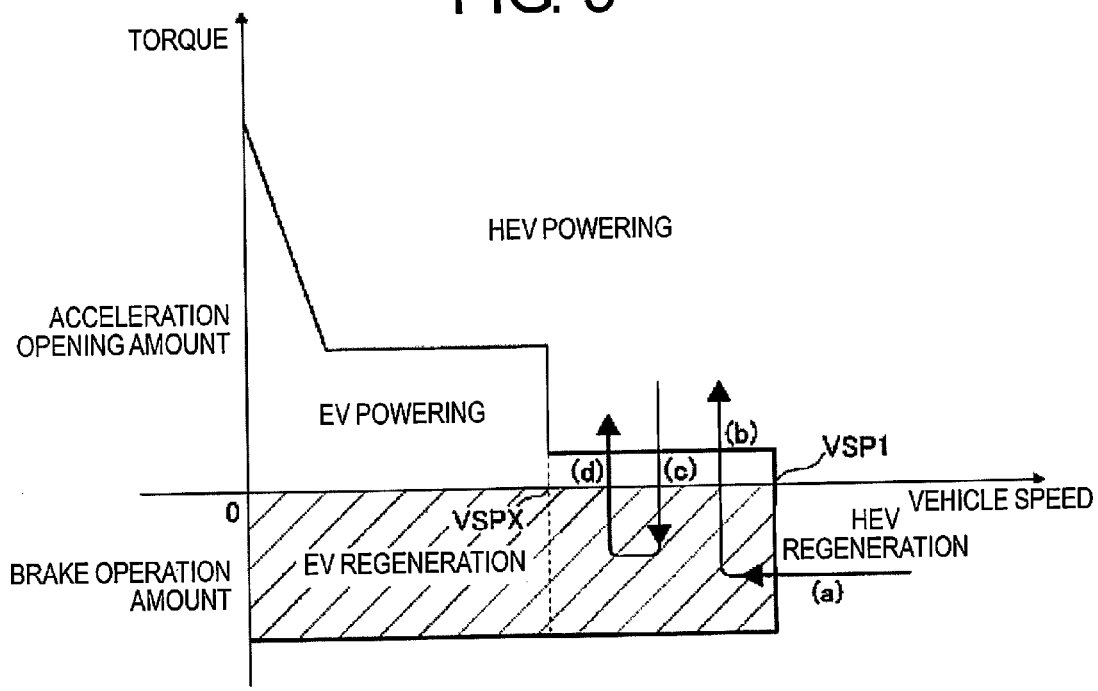
FIG. 4 is a mode map in which the traveling modes of the hybrid vehicle of the first embodiment are set.

FIG. 4 is a mode map in which the traveling modes of the hybrid vehicle of the first embodiment are set. In the mode map of FIG. 4, the traveling mode is set according to the acceleration opening amount when above 0 on the vertical axis and is set according to the ON/OFF state of the brake switch 26 when below 0. In the EV powering region in which the accelerator pedal 19 is depressed, the powering region by the EV mode is set to the powering vehicle speed VSPX. The details of this powering vehicle speed VSPX will be described below. In addition, in a region representing a state in which the accelerator pedal 19 is hardly depressed (for example, an acceleration opening amount that is sufficiently smaller than ⅛), the powering region by the EV mode is set to a predetermined vehicle speed VSP1, which is a higher vehicle speed than the powering vehicle speed VSPX. The region that is equal to or less than this predetermined vehicle speed VSP1 is almost never selected in a state in which the accelerator pedal 19 is depressed. On the other hand, when the accelerator pedal 19 is released when traveling in the HEV mode to transition to coasting (inertial) traveling, or when the brake pedal 16 is depressed from a powering state by the HEV mode to stop the vehicle, improved energy efficiency is achieved by converting the kinetic energy of the vehicle into electric power with regenerative braking via the electric motor 2 and then storing the electric power in the battery 12 (HEV regeneration state).

When performing regenerative braking while in the HEV mode (HEV regeneration state), since the clutch CL is in an engaged state, the regenerative braking energy is reduced by the amount of the reverse drive force of the engine 1 (engine brake) and the amount of the friction of the continuously variable transmission 4, making the energy regeneration efficiency poor. Accordingly, regenerative braking is started while traveling in the HEV mode; when falling below the predetermined vehicle speed VSP1, the engine 1 and the variator CVT are detached from the driving wheels 5 by releasing the clutch CL to transition to a traveling by the EV mode. The vehicle is thereby put in an EV regeneration state, and the friction from the engine 1 and the continuously variable transmission 4 is reduced so that the energy regeneration amount can increase by that amount.

Additionally, when traveling in the EV mode, from the point of view of fuel efficiency, the engine 1 is stopped by prohibiting the restart of fuel injection to the engine 1 (fuel recovery), so that stopping fuel injection to the engine 1 that was executed during coasting (fuel cut) continues after releasing the clutch CL.

Regarding Transmission Ratio Maintenance in the EV Mode

The transmission ratio maintenance in the EV mode will be described next. For example, as illustrated by the arrow (a) shown in the mode map in FIG. 4, when decelerating by operating the brake from the HEV regeneration region and entering the EV regeneration region to be in the EV regeneration state, the clutch CL is released, and the engine 1 is stopped. Then, as illustrated by the arrow (b) in FIG. 4, when the required driving force becomes equal to or greater than prescribed by depressing the accelerator pedal 19, the operation transitions to the HEV powering region. In the same way, for example, as illustrated by the arrow (c) in FIG. 4, when entering the EV regeneration region to be in the EV regeneration state, by operating the brake from the HEV powering region, in which the accelerator pedal 19 is depressed, the clutch CL is released, and the engine 1 is stopped. Then, as illustrated by the arrow (d) in FIG. 4, when the required driving force becomes equal to or greater than prescribed by depressing the accelerator pedal 19, the operation transitions to the HEV powering region. At this time, the engine 1 is restarted with the starter motor 3, and the clutch CL is engaged to switch from the EV mode to the HEV mode.

In this way, when driving when the accelerator pedal 19 is depressed again after having been releasing, when using the vehicle in a traveling environment in which such driving is necessary, or when, in a state in which the brake pedal 16 is depressed to decelerate, the brake is released before the vehicle stops and the accelerator pedal 19 is depressed (hereinafter referred to as a change-mind), switching from the EV mode to the HEV mode is necessarily performed.

Figure 5:
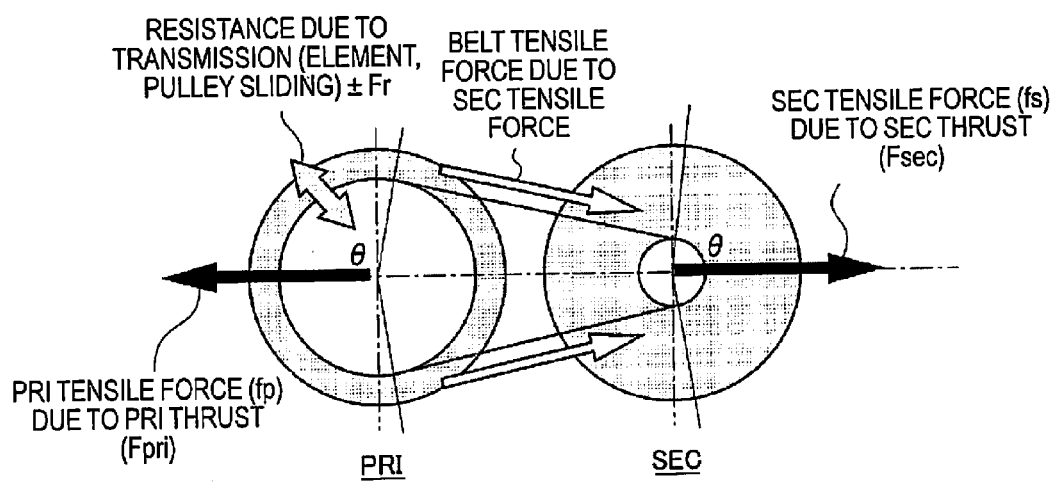
FIG. 5 is a schematic view showing the action/reaction of the force in the variator of the first embodiment.

Here, changes in the transmission ratio when hydraulic pressure is not supplied to the variator CVT while traveling by the EV mode will be described. FIG. 5 is a schematic view showing the action/reaction of force in the variator of the first embodiment. In the variator CVT of the first embodiment, a secondary spring SEC_SPR that presses in a direction in which the secondary pulley groove width narrows is housed in a pulley chamber of the secondary pulley 7. Therefore, when the hydraulic pressure in the primary pulley 6 or the hydraulic pressure in the secondary pulley 7 decreases, the secondary thrust Fsec from the secondary spring SEC_SPR becomes dominant, and a force to narrow the secondary pulley groove width is applied. Accompanying the above, tensile force fs is generated in the V-belt 8 (hereinafter referred to as the secondary tensile force), and a force to widen the groove width of the primary pulley 6 is applied, with the V-belt 8 being pulled to the secondary pulley 7 side. Basically, while a command to release the clutch CL is being output, in actuality, minute rotation is generated in each pulley due to the dragging of oil, etc.; if a force such as that illustrated in FIG. 5 is applied in this state, a low return occurs, shifting the transmission ratio of the variator CVT to the low side. Even when each pulley is not being rotated, the transmission ratio of the variator CVT is shifted to the low side all the same due to a longitudinal slippage in which the V-belt 8 moves inside of the pulley groove in the radial direction.

That is, when traveling in the EV mode, if no hydraulic pressure is supplied to the variator CVT at all, the transmission ratio is gradually shifted to the low side according to the elapsed time or the degree of decline of the hydraulic pressure. Depending on the size of the secondary thrust Fsec, there are cases in which shifting eventually occurs to the lowest transmission ratio. When traveling by the EV mode, the engine 1 is stopped, and the clutch CL is in a released state, so that the rotation of the variator CVT is stopped or is reduced to an extremely low rotational speed. Accordingly, the primary rotational speed and the secondary rotational speed cannot be detected, and the actual transmission ratio during EV mode traveling cannot be detected.

Then, when a mode switch request from the EV mode to the HEV mode is output accompanying a change-mind, engaging the clutch CL by first starting the engine 1 to rotate the variator CVT, detecting the transmission ratio, and performing transmission control is necessary; as a result, there is the problem that mode switching takes time.

Additionally, for example, when switching from the HEV mode to the EV mode, eliminating the detection operation by recognizing the transmission ratio in advance by shifting to the lowest transmission ratio beforehand is also conceivable. However, in this case, shifting to the low side before switching to the EV mode is necessary, preventing the possibility of rapidly switching to the EV mode; as a result, an improvement in the fuel efficiency is difficult to achieve.

Furthermore, the engine rotational speed must be increased in order to achieve synchronization with the rotational speed of the driving wheel side when shifting to the lowest transmission ratio and switching from the EV mode to the HEV mode in a relatively high vehicle speed side, which results in a delay with respect to the acceleration request of the driver, increasing to the time required to increase the engine rotational speed. When the clutch CL is engaged at once before synchronizing the engine rotational speed, drag shock occurs even though an acceleration request is being output, imparting discomfort to the driver.

If, in the EV mode state, the mode can be switched quickly, the transmission ratio of the variator CVT is constantly shifted according to the shifting map, regardless of when the switching from the EV mode to the HEV mode occurs, since a relative rotation is not generated in the clutch CL. However, forcibly shifting the variator CVT in a non-rotating state requires an output that is extremely large for an output of the electric oil pump EO/P; as a result, there is the risk that the vehicle mounting ability will deteriorate with an increase in size, as well as with an increase in energy consumption.

Therefore, the first embodiment is configured to activate the electric oil pump EO/P when a request is made to switch to the EV mode (EV regeneration state) during deceleration by the HEV mode in order to maintain the transmission ratio of the continuously variable transmission 4 at that point in time as the predetermined transmission ratio.

Regarding the Method for Maintaining the Transmission Ratio

Figure 6:
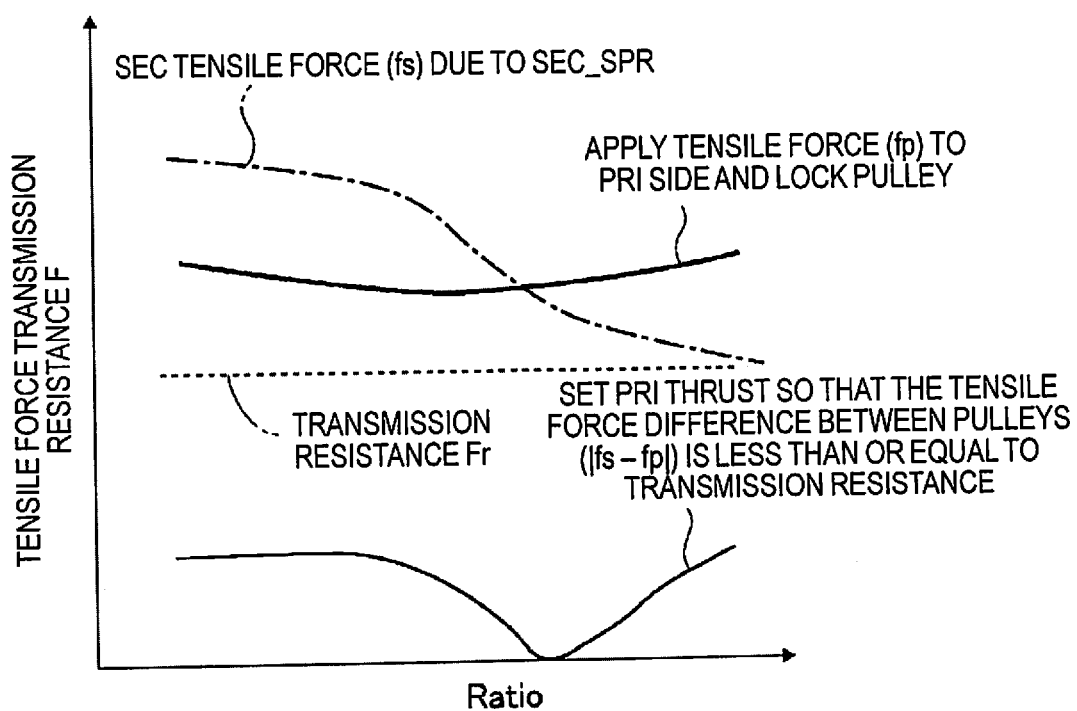
FIG. 6 is a characteristic view representing the relationship between the action/reaction of force in the variator in FIG. 5 and the hydraulic pressure necessary for maintaining the transmission ratio.

The method for maintaining the predetermined transmission ratio when switching from the HEV mode to the EV mode will be explained here. FIG. 6 is a characteristic view representing the relationship between the action/reaction of force in the variator in FIG. 5 and the hydraulic pressure necessary for maintaining the transmission ratio. When a secondary thrust Fsec is generated by the secondary spring SEC_SPR, a secondary tensile force fs corresponding to the transmission ratio is generated. At this time, when attention is focused on the primary pulley 6, the sliding resistance between the pulley and the V-belt 8 (hereinafter referred to as the transmission resistance Fr) will constantly act in a direction to prevent the movement of the V-belt 8. The set load of the secondary spring SEC_SPR is set to a size that overcomes the sliding resistance Fr across the entire transmission ratio region. At this time, a tensile force fp is generated by generating a predetermined hydraulic pressure on the primary pulley 6. Regarding the amount of this tensile force fp, a predetermined hydraulic pressure is supplied so that the tensile force difference between the pulleys (|fs−fp|) will be less than the transmission resistance Fr. For example, as illustrated by the thick solid lines in FIG. 6, the tensile force difference between the pulleys can be set to be less than the transmission resistance Fr by setting a value that will be within a tensile force range that the secondary spring SEC_SPR can take in any transmission ratio region; as a result, the transmission ratio can be maintained by simply supplying a relatively low predetermined hydraulic pressure.

Transmission Ratio Maintenance Control Operation

Figure 7:
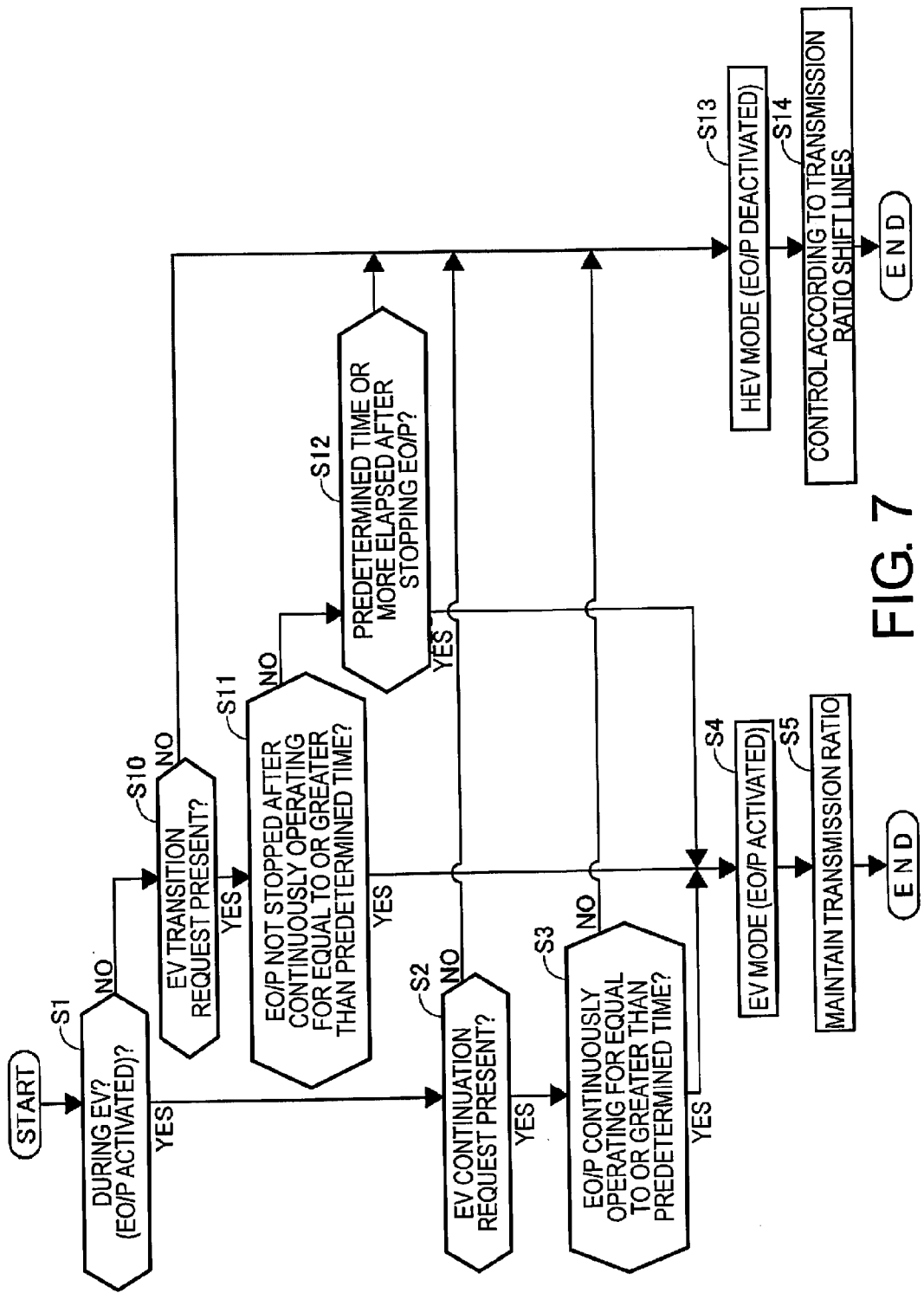
FIG. 7 is a flow chart representing the transmission ratio maintenance control operation in the EV mode of the first embodiment.

FIG. 7 is a flow chart representing the transmission ratio maintenance control operation in the EV mode of the first embodiment. In step S1, whether or not the mode is in the EV mode and whether or not the electric oil pump EO/P is activated are determined; if a determination is made that the mode is not in the EV mode (because the mode is in the HEV mode) or that the electric oil pump EO/P is in a deactivated state, the operation proceeds to step S10; otherwise, the operation proceeds to step S2. In step S2, whether or not there is a request to continue to select the EV mode is determined; if the selection is to continue with the EV mode, the operation proceeds to step S3; otherwise, the operation proceeds to step S13.

In step S3, whether or not the operating time of the electric oil pump EO/P is equal to or greater than a continuous operation allowable time (for example, three minutes) that is set in advance is determined; if the operating time is less than the continuous operation allowable time, the operation proceeds to step S4; if the operation time of the electric oil pump EO/P is equal to or greater than the continuous operation allowable time, the operation proceeds to step S13, the electric oil pump EO/P is deactivated (the electric oil pump EO/P is determined to be at a high temperature, and the operation of the electric oil pump EO/P is prohibited), and the HEV mode is selected in place of the EV mode. In this case, the mechanical oil pump O/P will be activated instead of the electric oil pump EO/P. Then, the operation proceeds to step S14, and transmission ratio control is performed according to the shift lines set in the shifting map.

In step S10, whether or not there is a transition request to switch to the EV mode is determined; if there is a transition request to switch from the HEV mode to the EV mode, the operation proceeds to step S11; otherwise, the operation proceeds to step S13, and the HEV mode is selected. In this case, since the mechanical oil pump O/P is activated, the electric oil pump EO/P is deactivated. Then, the operation proceeds to step S14, and transmission ratio control is performed according to the shift lines set in the shifting map.

In step S11, whether the electric oil pump EO/P is in a stopped state simply due to the HEV mode, not as a result of the electric oil pump EO/P having been continuously operated for the continuous operation allowable time or more in the past, is determined; if the determination is that this has been stopped due to the HEV mode, the operation proceeds to step S4, the EV mode is selected, and the operation of the electric oil pump EO/P is continued. In conjunction with this, the secondary pulley pressure solenoid 37-2 is closed, and the opening degree of the primary pulley pressure solenoid 37-1 is controlled so that the hydraulic pressure from the electric oil pump EO/P will only be supplied to the primary pulley 6 without being supplied to the secondary pulley 7 in order to maintain the transmission ratio during the EV mode when switching from the HEV mode to the EV mode (step S5).

Figure 8:
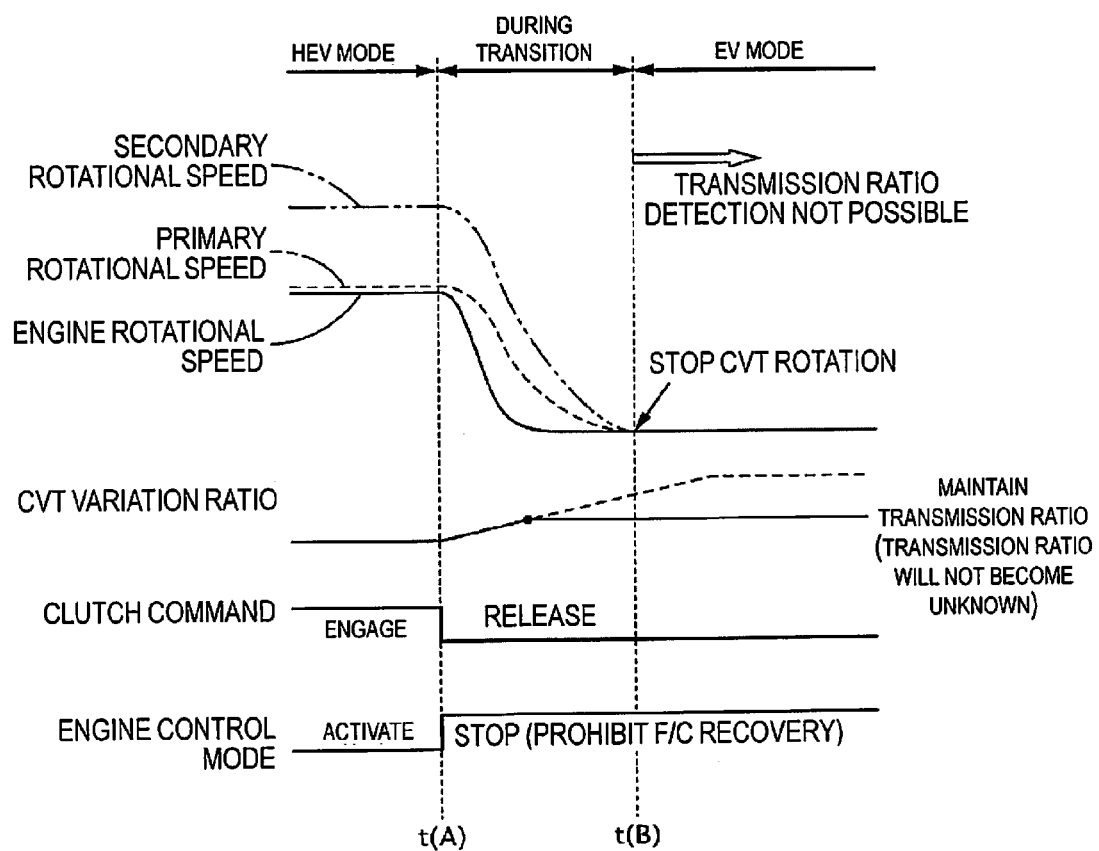
FIG. 8 is a time chart representing the details of the transmission ratio maintenance during mode transition in the first embodiment.

The details of the predetermined transmission ratio when switching from the HEV mode to the EV mode, that is, during mode transition, will be described here. FIG. 8 is a time chart representing the details of the transmission ratio maintenance during mode transition in the first embodiment. When there is a switching request to switch to the EV mode at a time t(A) when traveling in the HEV mode, the clutch is controlled to have an engaging capacity of zero by outputting a release command thereto. Engine stop of the engine 1 is executed by prohibiting the fuel cut recovery control. As a result, the secondary rotational speed, the primary rotational speed, and the engine rotational speed will gradually decrease from time t(A) while performing inertial rotation and will ultimately stop at time t(B). With a decrease in the discharge amount of the mechanical oil pump O/P due to this decrease in the rotational speed, the hydraulic pressure is decreased, a low return occurs due to the set load of the secondary spring SEC_SPR, and the transmission ratio of the variator CVT gradually changes to the low side.

At this time, from times t(A) to t(B) during the transition, that is, when the primary pulley 6 and the secondary pulley 7 are still rotating, the transmission ratio of the variator CVT can be detected based on the rotational speed. Therefore, the time for maintaining the transmission ratio or for the predetermined transmission ratio to be maintained needs only to be appropriately set in a state in which the transmission ratio can be perceived when transiting from the HEV mode to the EV mode In step S12, after the electric oil pump EO/P is stopped due to being operated for the continuous operation allowable time or more, whether or not a predetermined time (for example, 1 minute) required to cool the electric oil pump EO/P has elapsed is determined; if the determination is that the predetermined time has elapsed, since the electric oil pump EO/P can be operated, the operation proceeds to step S4, the EV mode is selected, and the electric oil pump EO/P is activated. On the other hand, if the necessary amount of predetermined time is determined to not have elapsed, since the electric oil pump EO/P cannot be operated, the operation proceeds to step S13; even if there has been a transition request to switch to the EV mode, the HEV mode is selected, and the electric oil pump EO/P is deactivated; then in step S14, the transmission ratio will be in a controlled state as usual. The EV mode will thereby not be switched to the HEV mode, and the hydraulic pressure will be constantly secured by the mechanical oil pump O/P, so that drag shock, etc. will not be generated.

Action by the Transmission Ratio Maintenance Control Operation at the Time of Change-Mind Before Stopping a Vehicle The action based on the flowchart described above will be described next. First, a situation will be described in which the HEV mode is switched to the EV mode during deceleration and, subsequently, the accelerator pedal 19 is depressed midway before the vehicle stops (change-mind) and is switched back to the HEV mode again.

Action Based on a Comparative Example

Figure 9:
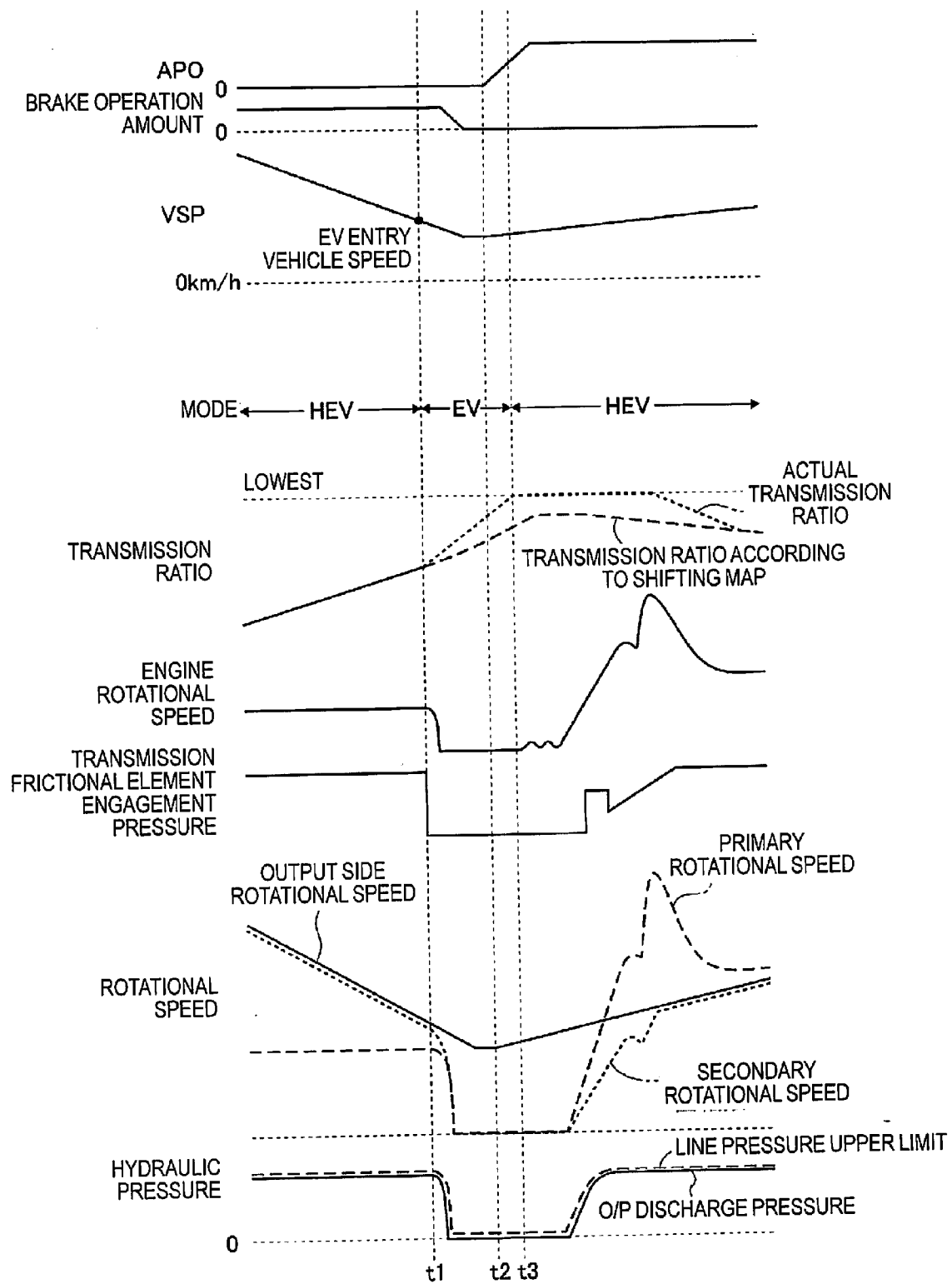
FIG. 9 is a time chart showing when hydraulic pressure is not generated during an EV mode in the hybrid vehicle of a comparative example.

A case in which the mode transitions to the HEV mode due to change-mind after transitioning from the HEV mode to the EV mode, when the electric oil pump EO/P is constantly deactivated, or in a case in which a vehicle is not equipped with an electric oil pump EO/P will be described as comparative examples. FIG. 9 is a time chart showing when hydraulic pressure is not generated during an EV mode in the hybrid vehicle of a comparative example. The first traveling state is a deceleration state in the HEV mode in which the accelerator pedal 19 is released and the brake pedal 16 is depressed.

At time t1, the vehicle speed VSP is decreased to a vehicle speed set as the EV regeneration region in the mode map, so the HEV regeneration state is switched to the EV regeneration state. The clutch CL is thereby released, the engine 1 is stopped, and the hydraulic pressure of the mechanical oil pump O/P will also become zero. Therefore, the transmission ratio of the variator CVT will gradually change toward the lowest transmission ratio by the clamping force of the secondary spring (low return) SEC_SPR.

At time t2, the driver starts to depress the accelerator pedal 19 from the deceleration state due to change-mind, and makes an acceleration request. Then, at time t3, when the acceleration opening amount APO increases to a region in which HEV powering is set in the mode map, the EV mode (EV regeneration state) is switched to the HEV mode (HEV powering state).

At this time, the output side rotational speed of the clutch CL (value corresponding to the vehicle speed) is in a relatively high state, while the transmission ratio of the variator CVT is changed to the lowest transmission ratio. Therefore, before engine start and immediately before engaging the clutch CL, the primary rotational speed is reduced by the variator CVT, and the secondary rotational speed will be a rotational speed that is lower with respect to the primary rotational speed; therefore, the secondary rotational speed will become a rotational speed that is lower than the output side rotational speed. If the clutch CL is engaged in this state, the secondary rotational speed will be dragged by the output side rotational speed, which is accompanied by the primary rotational speed (engine rotational speed) entering an over-revved state, and creating a risk to impart discomfort to the driver. Additionally, the secondary rotational speed will transition from a state that is lower than the output side rotational speed of the clutch CL to a full engagement state; as a result, drag shock is generated in the driving wheels. Therefore, even though the driver is making an acceleration request by depressing the accelerator pedal 19, the engine rotational speed will excessively rev up causing further drag shock, causing extreme discomfort.

Action Based on the First Embodiment

Figure 10:
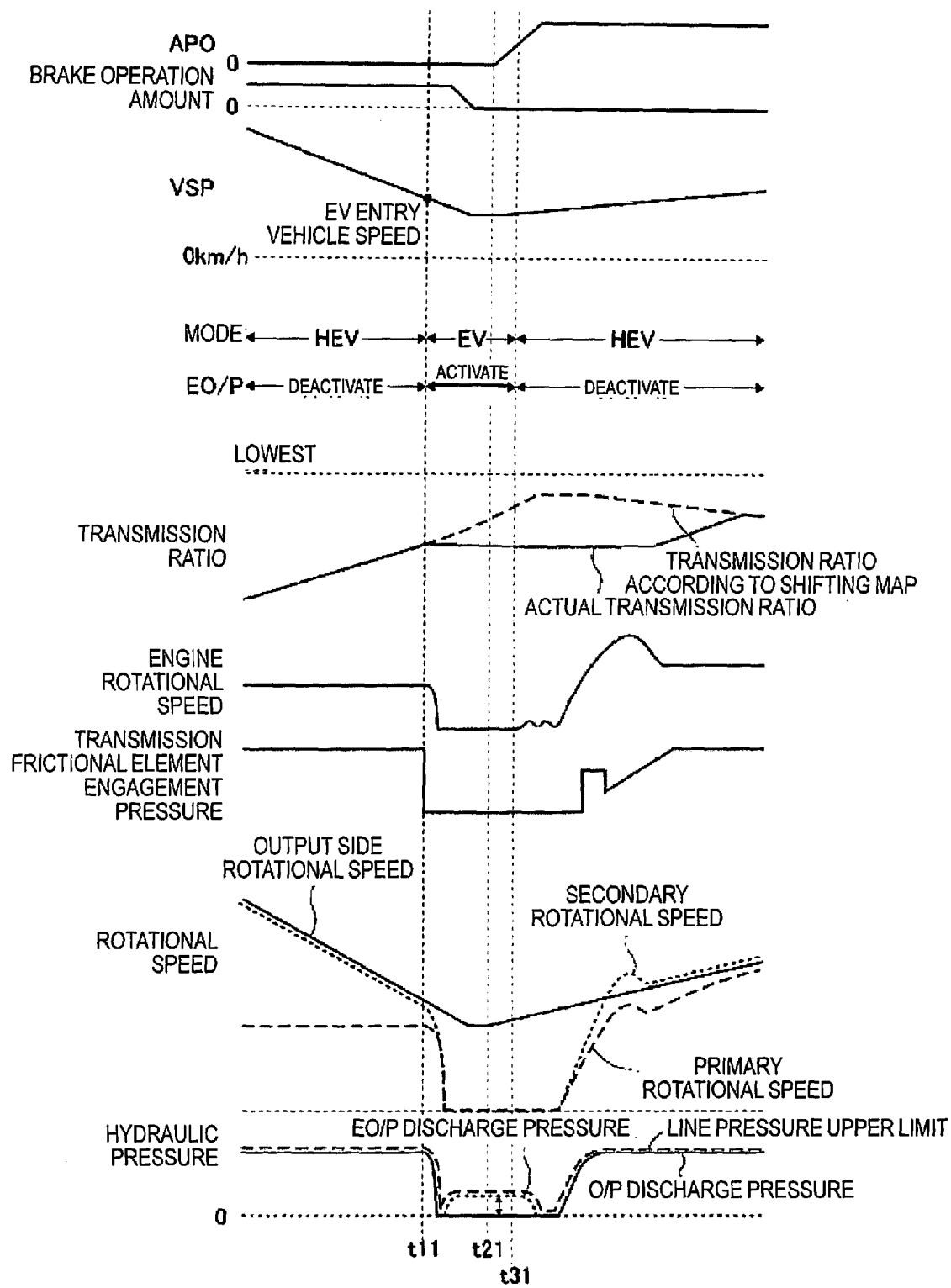
FIG. 10 is a time chart showing when hydraulic pressure is generated by activating an electric oil pump EO/P during the EV mode in the hybrid vehicle of the first embodiment.

The first embodiment will be described next. FIG. 10 is a time chart showing when hydraulic pressure is generated by activating an electric oil pump EO/P during the EV mode in the hybrid vehicle of the first embodiment. The first traveling state is a deceleration state in the HEV mode in which the accelerator pedal 19 is released and the brake pedal 16 is depressed.

At time t11, the vehicle speed VSP is decreased to a region in which EV regeneration is set in the mode map, so that the HEV regeneration state is switched to the EV regeneration state. The clutch CL is thereby released, the engine 1 is stopped, and the hydraulic pressure of the mechanical oil pump O/P will become zero. At this time, since the electric oil pump EO/P is activated, a certain degree of hydraulic pressure is secured; thus, a predetermined hydraulic pressure is generated in the primary pulley 6, and the transmission ratio of the variator CVT is maintained at the transmission ratio for switching from the HEV mode to the EV mode.

At time t21, the driver starts to depress the accelerator pedal 19 from the deceleration state due to change-mind and makes an acceleration request. Then, at time t31, when the acceleration opening amount APO increases to a region in which HEV powering is set in the mode map, the EV regeneration state is switched to the HEV powering state.

At this time, the output side rotational speed of the clutch CL (the value corresponding to the vehicle speed) is in a relatively high state while the transmission ratio of the variator CVT is maintained at the transmission ratio for switching from the HEV mode to the EV mode. Since switching is basically done in a coasting state, the transmission ratio for switching from the HEV mode to the EV mode is set to be a transmission ratio along the coast line, as illustrated by the shifting map illustrated in FIG. 3. Therefore, when switching from the HEV mode to the EV mode at a vehicle speed indicated by the arrow (a) in FIG. 4, the switching is done in a state in which the transmission ratio of the variator CVT is the highest transmission ratio or a transmission ratio that is on the higher side of 1.

In addition, when switching from the HEV mode to the EV mode at a vehicle speed indicated by the arrow (c) in FIG. 4, a case can be conceived in which the transmission ratio immediately before the mode switch is in the vicinity of the lowest transmission ratio if the accelerator pedal 19 is depressed when traveling in the HEV mode. Here, upon releasing the clutch CL following the switch to the EV mode, "the elapsed brake pedal 16 depression time is equal to or greater than a predetermined time (for example, two seconds or more)" is set as the releasing condition. Therefore, with the accelerator pedal 19 being released, the high-speed mode highest line in FIG. 3 is selected; when upshifting the transmission ratio from the vicinity of the lowest transmission ratio toward the highest transmission ratio, the shifting time will be secured by the clutch releasing condition; the transmission ratio will be shifted to the highest transmission ratio or to the vicinity of the highest transmission ratio (a transmission ratio that is at least on the higher side of 1); and this transmission ratio is maintained.

Therefore, when restarting the engine, if the engine rotational speed is revved up once accompanying a complete combustion of the engine, this rotational speed is accelerated by the variator CVT, increasing the secondary rotational speed; as a result, the secondary rotational speed will be in a higher state than the output side rotational speed. Since the state transitions to a full engagement state, drag shock will not be generated in the driving wheels 5. That is, when the driver makes an acceleration request by depressing the accelerator pedal 19, the engine rotational speed will not excessively rev up and cause drag shock, and the mode switches to the HEV mode.

Additionally, to achieve an extremely low vehicle speed, if the highest transmission ratio is maintained, the engine 1 rotational speed will become lower than the idling rotational speed, causing the engine stall; therefore, the coast line is set to downshift toward the lowest transmission ratio following a vehicle speed decrease, as illustrated in FIG. 3. In a situation in which switching to the EV mode is performed from an HEV mode in which the accelerator pedal 19 is greatly depressed, by suddenly depressing the brake pedal 16 before the vehicle speed increases, in an extreme low vehicle speed region in this manner, there is a risk regarding the maintained transmission ratio, with the risk being that the transmission ratio of the variator CVT will be on the lower side of one. However, in these special cases, drag-shock can be suppressed by upshifting the variator CVT to the high side before the next full engagement of the clutch CL, so there is no cause for concern.

As illustrated in the shifting map in FIG. 3, the target transmission ratio set in a state in which the accelerator pedal 19 is released is basically the highest transmission ratio along the high-speed mode highest line. However, as described above, if the lowest transmission ratio were set during the HEV mode, there are cases in which shifting to the highest transmission ratio is not possible, even if shifting is performed toward the highest transmission ratio for only a predetermined time (for example, two seconds) set in the clutch releasing conditions when switching to the EV mode. The transmission ratio that is minimally achieved at this time is defined as the predetermined transmission ratio.

Now, a state in which the HEV mode is switched to the EV mode and the variator CVT is maintained at a predetermined transmission ratio is assumed. In this state, if the driver gently depresses the accelerator pedal 19 and the vehicle speed increases maintaining the EV powering state of the EV mode to reach the powering vehicle speed VSPX, as illustrated in the mode map in FIG. 4, a mode switch request from the EV mode to the HEV mode is output. At this time, if the engine rotational speed is revved up once accompanying a complete combustion of the engine due to an engine restart, this rotational speed increases the secondary rotational speed by a predetermined transmission ratio. At this time, the powering vehicle speed VSPX is set within a vehicle speed range in which the raised secondary rotational speed will be a rotational speed that is equal to or greater than the output side rotational speed of the clutch CL. That is, the powering vehicle speed VSPX set as the EV powering region is set to be a vehicle speed in which, when switching to the HEV mode at any of the transmission ratios that the variator CVT is capable of maintaining, switching to the HEV mode can be performed without the engine rotational speed being excessively revved up and while preventing drag shock.

Figure 11:
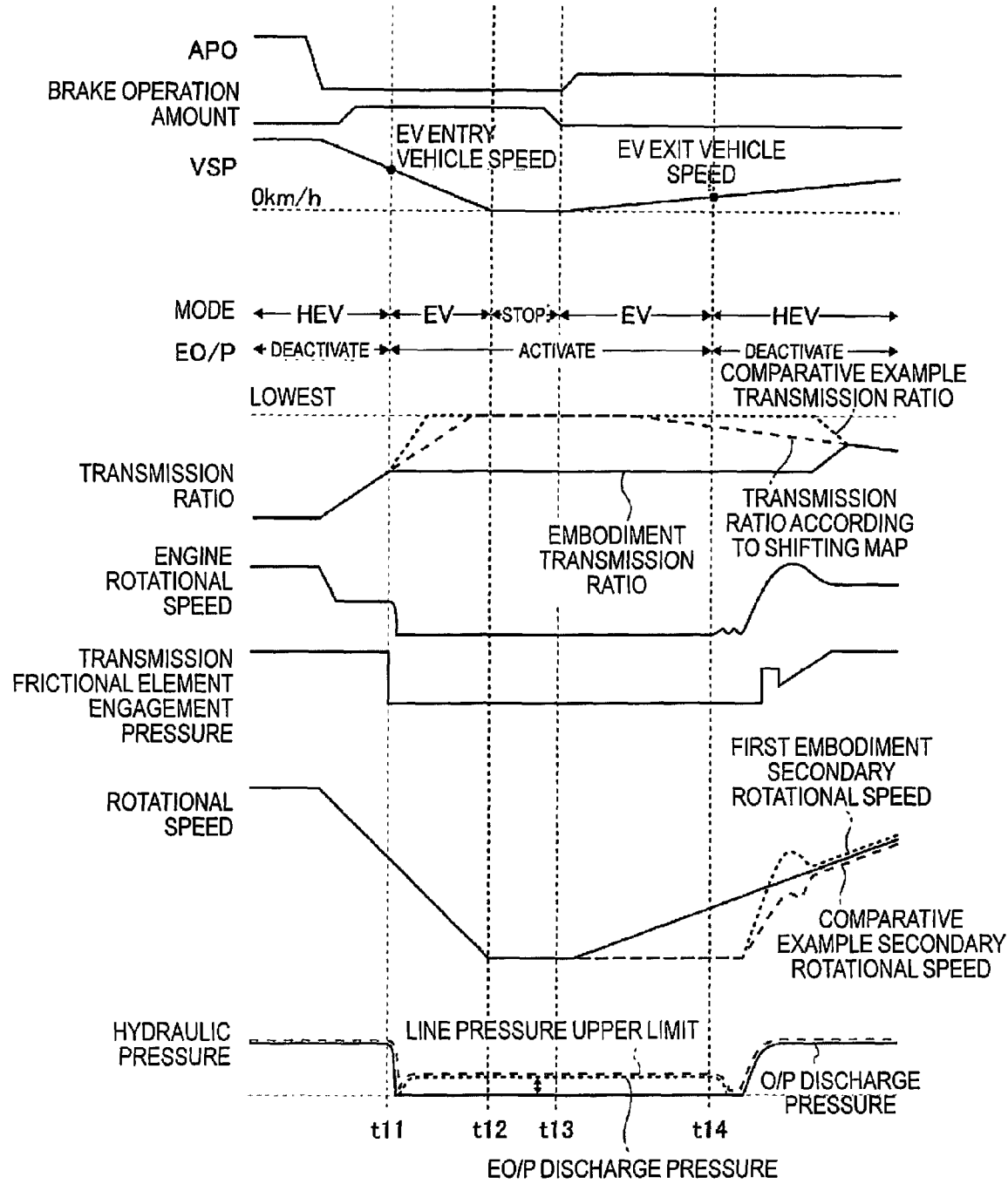
FIG. 11 is a time chart showing the performance of a transmission ratio maintenance control, including when a vehicle is stopped.

Action by the Transmission Ratio Maintenance Control Operation, Including Stopping a Vehicle FIG. 11 is a time chart showing the performance of a transmission ratio maintenance control, including when stopping a vehicle stop. Here, an example of one in which the transmission ratio is a ratio according to low return while in the EV mode and is then automatically shifted to the lowest transmission ratio when a predetermined time has elapsed after being switched to the EV mode will be described as a comparative example.

Action Based on a Comparative Example

The first traveling state is a deceleration state in the HEV mode in which the accelerator pedal 19 is released and the brake pedal 16 is depressed.

At time t11, the vehicle speed VSP is decreased to a vehicle speed set as the EV regeneration region in the mode map, so that the HEV mode (HEV regeneration state) is switched to the EV mode (EV regeneration state). The clutch CL is thereby released, the engine 1 is stopped, and the hydraulic pressure of the mechanical oil pump O/P will become zero. Therefore, the transmission ratio of the variator CVT will gradually change to the lowest transmission ratio.

Even if the vehicle stops at time t12, transmission ratio control, etc. is not specifically executed since the vehicle is in the EV mode. Then, at time t13, the driver starts to depress the accelerator pedal 19 and makes an acceleration request. Next, at time t14, when the vehicle speed VSP increases to a powering vehicle speed VSPX where HEV powering is set in the mode map, the EV mode (EV regeneration state) is switched to the HEV mode (HEV powering state).

At this time, the output side rotational speed of the clutch CL (a value corresponding to the vehicle speed) is in a relatively high state while the transmission ratio of the variator CVT is changed to the lowest transmission ratio. Therefore, before starting the engine and immediately before engaging the clutch CL, the primary rotational speed is reduced by the variator CVT; as a result, the secondary rotational speed will be a rotational speed that is less than the output side rotational speed. If the clutch CL is engaged in this state, the secondary rotational speed will be dragged by the output side rotational speed, which is accompanied by the primary rotational speed (engine rotational speed) entering an over-revved state, creating a risk that discomfort will be imparted to the driver. Additionally, the secondary rotational speed will transition from a state that is lower than the output side rotational speed of the clutch CL to a full engagement state; as a result, drag shock is generated in the driving wheels. Therefore, even though the driver is making an acceleration request by depressing the accelerator pedal 19, the engine rotational speed will excessively rev up, causing further drag shock and extreme discomfort.

Action Based on the First Embodiment

The first embodiment will be described next. At time t11, the vehicle speed VSP is decreased to a vehicle speed set as the EV regeneration region in the mode map, so that the HEV mode (HEV regeneration state) is switched to the EV mode (EV regeneration state). The clutch CL is thereby released, the engine 1 is stopped, and the hydraulic pressure of the mechanical oil pump O/P will become zero. At this time, since the electric oil pump EO/P is activated, a certain degree of hydraulic pressure is secured; thus, a predetermined hydraulic pressure is generated in the primary pulley 6, and the transmission ratio of the variator CVT is maintained at the transmission ratio for switching from the HEV mode to the EV mode.

Even if the vehicle stops at time t12, the transmission ratio continues to be maintained since the vehicle is in the EV mode and the electric oil pump EO/P continues to be driven. Then, at time t13, the driver starts to depress the accelerator pedal 19 and makes an acceleration request. Next, at time t14, when the vehicle speed VSP increases to a powering vehicle speed VSPX where HEV powering is set in the mode map, the EV mode (EV regeneration state) is switched to the HEV mode (HEY powering state).

At this time, the output side rotational speed of the clutch CL (a value corresponding to the vehicle speed) is in a relatively high state while the transmission ratio of the variator CVT is maintained at the transmission ratio for switching from the HEV mode to the EV mode. Since switching is basically done in a coasting state, the transmission ratio for switching from the HEV mode to the EV mode is set to be a transmission ratio along the coast line, as illustrated by the shifting map illustrated in FIG. 3. Therefore, when switching from the HEV mode to the EV mode at a vehicle speed indicated by the arrow (a) in FIG. 4, the switching is done in a state in which the transmission ratio of the variator CVT is the highest transmission ratio or a transmission ratio that is on the higher side of 1.

In addition, when switching from the HEV mode to the EV mode at a vehicle speed indicated by the arrow (c) in FIG. 4, a case can be conceived in which the transmission ratio immediately before the mode switch is in the vicinity of the lowest transmission ratio if the accelerator pedal 19 is depressed while traveling in the HEV mode. Here, upon releasing the clutch CL following the switch to the EV mode, "the elapsed brake pedal 16 depression time is equal to or greater than two seconds" is set as the releasing condition. Therefore, with the accelerator pedal 19 being released, the high-speed mode highest line in FIG. 3 is selected; when upshifting the transmission ratio from the vicinity of the lowest transmission ratio toward the highest transmission ratio, the shifting time will be secured by the clutch releasing condition; the transmission ratio will be shifted to the highest transmission ratio or to the vicinity of the highest transmission ratio (transmission ratio that is at least on the higher side of 1); and this transmission ratio will be maintained.

Therefore, when restarting the engine, if the engine rotational speed is revved up once accompanying a complete combustion of the engine, this rotational speed is accelerated by the variator CVT, increasing the secondary rotational speed; as a result, the secondary rotational speed will be in a higher state than the output side rotational speed. Since the state transitions into a full engagement state, drag shock will not be generated in the driving wheels 5. That is, when the driver makes an acceleration request by depressing the accelerator pedal 19, the engine rotational speed will not excessively rev up and cause drag shock, and the mode is switched to the HEV mode. When downshifting the variator CVT is necessary when engaging the clutch CL, the required driving force requested by the driver can be achieved by engaging the clutch CL while downshifting the transmission control.

Regarding the Electric Oil Pump Operation Operation

Figure 12:
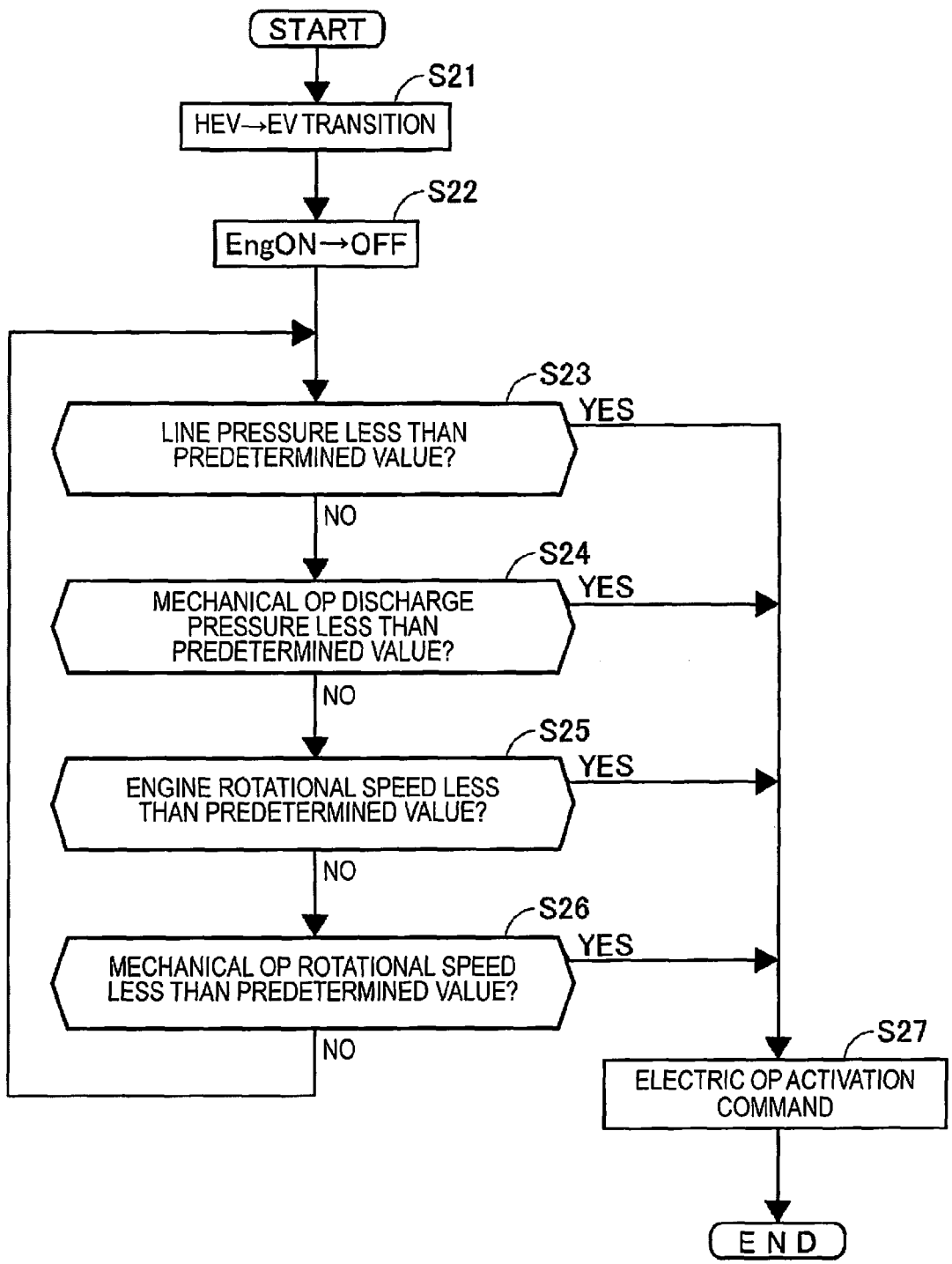
FIG. 12 is a flowchart representing the electric oil pump operation of the first embodiment.

The operation in which there is a mode switch request from the HEV mode to the EV mode and the electric oil pump EO/P is activated will be described next. FIG. 12 is a flowchart representing the electric oil pump operation of the first embodiment. In step S21, a transition request to switch from the HEV mode to the EV mode is output. In step S22, the engine 1 is switched from ON (operating state) to OFF (stopped state). Specifically, fuel injection is stopped. In step S23, whether or not the line pressure is less than a predetermined value is determined; if this is less than the predetermined value, the operation proceeds to step S27, and an activation command for the electric oil pump EO/P is output. In step S24, whether or not the discharge pressure of the mechanical oil pump O/P is less than a predetermined value is determined; if this is less than the predetermined value, the operation proceeds to step S27, and an activation command for the electric oil pump EO/P is output. In step S25, whether or not the engine rotational speed is less than a predetermined value is determined; if this is less than the predetermined value, the operation proceeds to step S27, and an activation command for the electric oil pump EO/P is output. In step S26, whether or not the rotational speed of the mechanical oil pump O/P is less than a predetermined value is determined; if this is less than the predetermined value, the operation proceeds to step S27, and an activation command for the electric oil pump EO/P is output.

Figure 13:
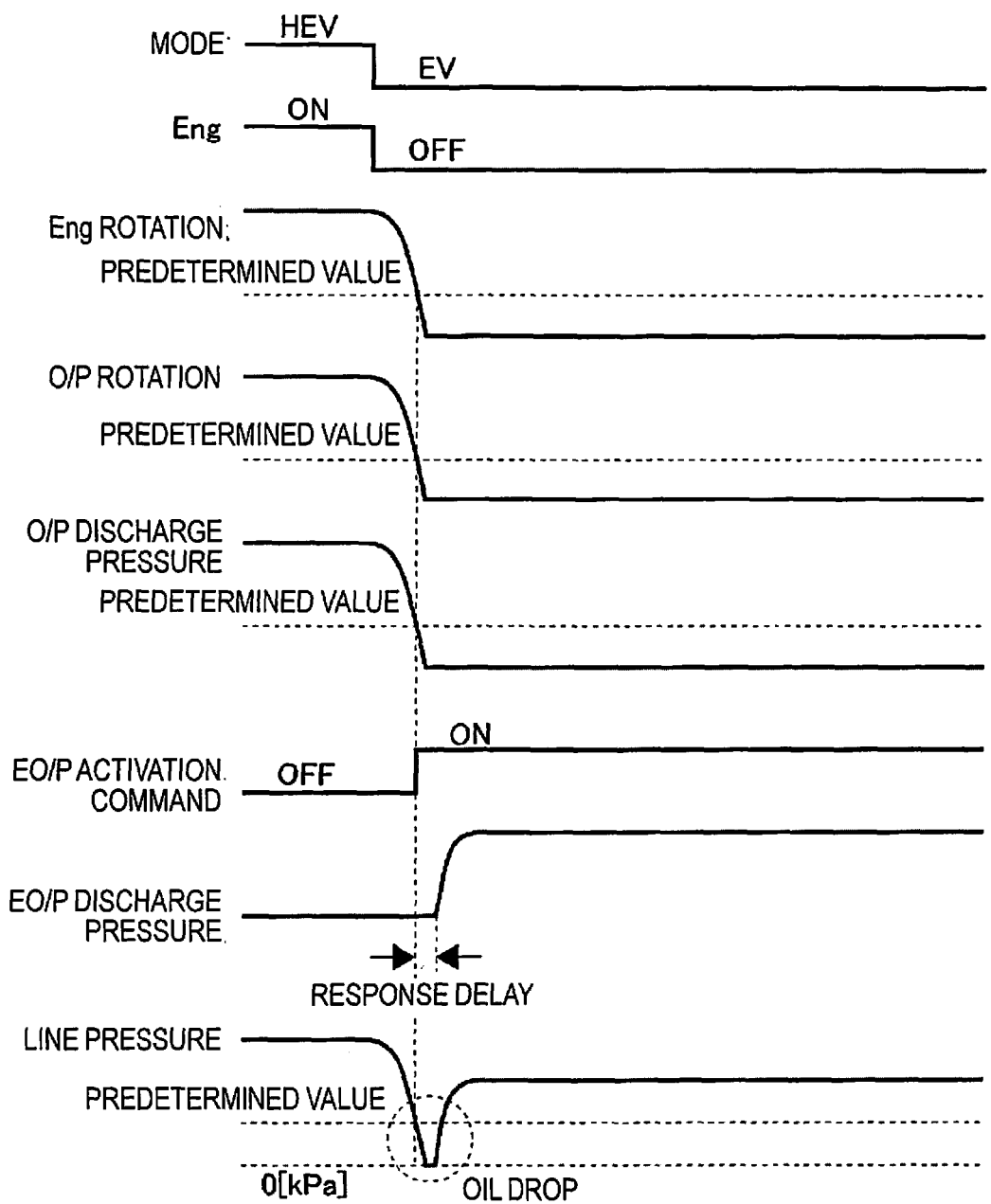
FIG. 13 is a time chart representing the electric oil pump operation of the first embodiment.

FIG. 13 is a time chart representing the electric oil pump operation of the first embodiment. That is, upon activating the electric oil pump EO/P, a determination is made that the electric oil pump EO/P should be activated in order to secure the hydraulic pressure for maintaining the transmission ratio when one of the following conditions has been met: the line pressure has actually decreased; the discharge pressure of the mechanical oil pump O/P has decreased; the rotational speed of the engine, which is the drive source of the mechanical oil pump O/P, has decreased; or the rotational speed of the mechanical oil pump O/P has decreased. The electric oil pump EO/P will thereby not be unnecessarily driven, and energy consumption can be suppressed. Since there is a response delay between when an activation command is output to the electric oil pump EO/P and when the discharge pressure is actually increased, a situation in which the line pressure momentarily declines to zero can be conceived; however, since a momentary decline will not cause the transmission ratio of the variator CVT to rapidly change to the low side, this is not a big problem.

Regarding the Electric Oil Pump Stopping Operation

Figure 14:
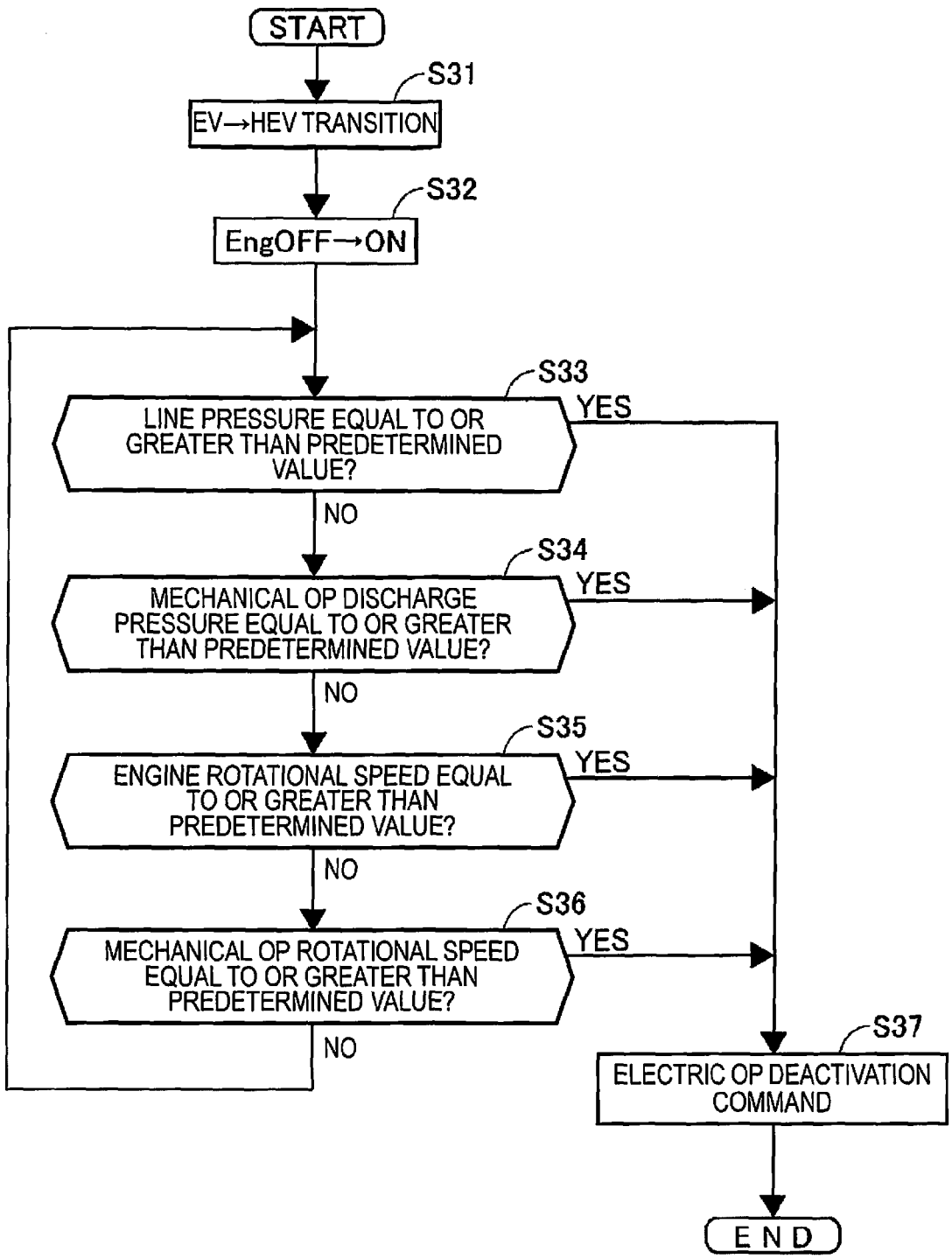
FIG. 14 is a flowchart representing the electric oil pump stopping operation of the first embodiment.

The stopping operation in which there is a mode switch request to switch from the HEV mode to the EV mode and the electric oil pump EO/P is stopped will be described next. FIG. 14 is a flowchart representing the electric oil pump stopping operation of the first embodiment. In step S31, a transition request to switch from the HEV mode to the EV mode is output. In step S32, the engine 1 is switched from OFF (stopped state) to ON (operating state). Specifically, the starter motor is driven, and fuel injection is restarted. In step S33, whether or not the line pressure is equal to or greater than a predetermined value is determined; if this is equal to or greater than the predetermined value, the operation proceeds to step S37, and the deactivation command for the electric oil pump EO/P is output. In step S34, whether or not the discharge pressure of the mechanical oil pump O/P is equal to or greater than a predetermined value is determined; if this is equal to or greater than the predetermined value, the operation proceeds to step S37, and the deactivation command for the electric oil pump EO/P is output. In step S35, whether or not the engine rotational speed is equal to or greater than a predetermined value is determined; if this is equal to or greater than the predetermined value, the operation proceeds to step S37, and the deactivation command for the electric oil pump EO/P is output. In step S36, whether or not the rotational speed of the mechanical oil pump O/P is equal to or greater than a predetermined value is determined; if this is equal to or greater than the predetermined value, the operation proceeds to step S37, and the deactivation command for the electric oil pump EO/P is output.

Figure 15:
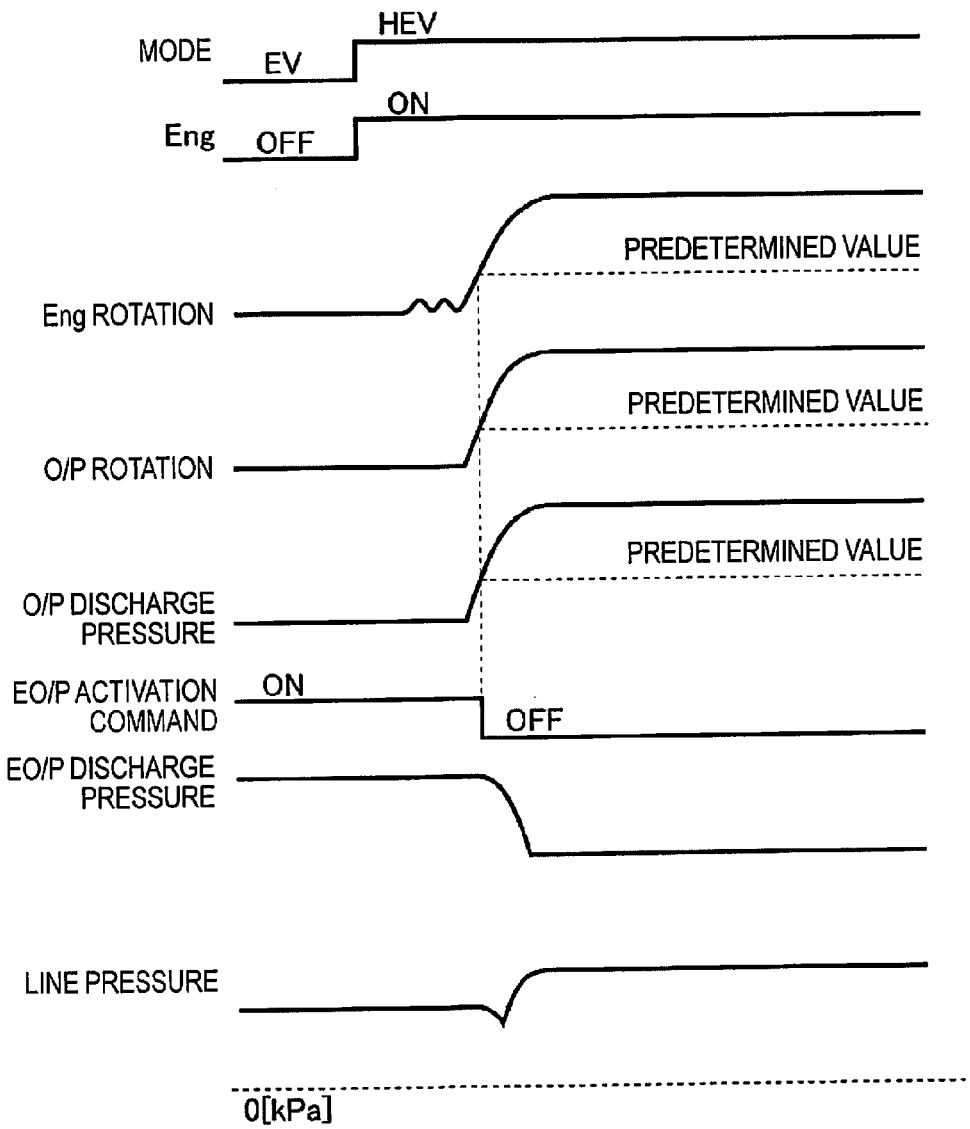
FIG. 15 is a time chart representing the electric oil pump stopping operation of the first embodiment.

FIG. 15 is a time chart representing the electric oil pump stopping operation of the first embodiment. That is, upon stopping the electric oil pump EO/P, a determination is made that the state has changed from a state of maintaining the transmission ratio to a state in which shifting is possible and that the electric oil pump EO/P should be deactivated, when One of the following conditions has been met: the line pressure has actually been secured; the discharge pressure of the mechanical oil pump O/P has been secured; the rotational speed of the engine, which is the drive source of the mechanical oil pump O/P, has been secured; or the rotational speed of the mechanical oil pump O/P has been secured. The electric oil pump EO/P will thereby not be unnecessarily driven, and energy consumption can be suppressed. Additionally, since a deactivation command is output to the electric oil pump EO/P in a state in which hydraulic pressure is secured, the line pressure will not momentarily decline to zero, and a responsive transmission ratio control can be achieved.

As described above, the effects listed below can be obtained with the first embodiment.

(1-1) In a hybrid vehicle comprising an engine 1, a variator CVT (continuously variable transmission) and an electric motor 2 (driving motor) including a clutch CL, which is capable of releasing between the driving wheels 5 and the variator CVT, when the electric motor 2 is driving or subjected to regenerative braking, the driving wheels 5 comprising a hybrid controller 24 (hereinafter referred to as controller) for stopping the engine 1 when the clutch CL is released, the controller is configured to maintain the transmission ratio of the variator CVT when the engine 1 is stopped. Therefore, quickly switching from the HEV mode to the EV mode is possible, and improving fuel efficiency can be achieved. Additionally, since the transmission ratio is maintained when switching from the EV mode to the HEV mode, an excessive increase in the engine rotational speed will not be caused by suppressing low return; as a result, the discomfort imparted to the driver can be suppressed.

(2-2) The engine comprises a mechanical oil pump O/P that is driven by the engine 1 and supplies hydraulic pressure to the variator CVT, and the controller is configured to supply hydraulic pressure to the variator CVT via the electric oil pump EO/P to maintain the transmission ratio of the variator CVT when the engine is stopped by the EV mode. Therefore, quickly switching from the HEV mode to the EV mode is possible, and improving fuel efficiency can be achieved. Additionally, since the transmission ratio is not shifted to the lowest side even when switching from the EV mode to the HEV mode, an excessive increase in the engine rotational speed will not be caused; as a result, the discomfort imparted to the driver can be suppressed. In addition, since the input side rotational speed of the clutch CL can be maintained to be higher than the output side rotational speed, a quick mode switch while avoiding drag shock due to the engagement of the clutch CL can be achieved. Furthermore, the necessary hydraulic pressure can be suppressed to a minimum, so that a cheap and small-sized electric oil pump EO/P can be employed. "When switching from the HEV mode to the EV mode" may be the switch command timing if the switch command timing from the HEV mode to the EV mode and the release timing of the clutch CL coincide. If the clutch CL is released after the switch command timing, the transmission ratio of either of the timings shall be maintained. For example, if the intent is to shift the transmission ratio a certain degree to the high side from the switch command timing, there are cases in which maintaining the transmission ratio at the clutch release timing is preferable.

(3-3) The variator CVT comprises a primary pulley 6, a secondary pulley 7, a belt 8 bridging the two pulleys (endless flexible member), and a secondary spring SEC_SPR (elastic body) for generating the clamping force for the secondary pulley 7; the controller is configured to maintain the transmission ratio by applying a constant pressure on the primary pulley 6. That is, the relationship between the belt and the pulley can be fixed by supplying a constant pressure and utilizing the tensile force based on the secondary spring SEC_SPR and the sliding resistance between the belt 8 and each pulley 6, 7; as a result, the transmission ratio can be maintained with a simple control when activating the electric oil pump EO/P.

(4-4) The controller supplies a constant pressure so that the absolute value of the difference between the secondary tensile force generated in the belt 8 by the secondary spring SEC_SPR and the primary tensile force generated in the belt 8 by the constant pressure will be less than the resistance tensile force that is generated by the sliding resistance that is generated between the belt 8 and each pulley 6, 7. Therefore, the transmission ratio can be maintained by supplying the minimum required hydraulic pressure, and the discharge capacity required of the electric oil pump EO/P will decrease; as a result, downsizing the electric oil pump EO/P can be achieved.

(5-5) The controller continues to maintain the maintained transmission ratio while stopped when stopping while in the EV mode. That is, in general, when the vehicle is stopped, the transmission ratio of the variator CVT is returned to the lowest transmission ratio, giving consideration to the starting ability after stopping. However, if returned to the lowest transmission ratio before starting in the EV mode, when the vehicle speed increases after starting in the EV mode, the EV mode is switched to the HEV mode, and the corresponding clutch CL is engaged; as a result, the secondary rotational speed will be in a lower state than the output side rotational speed of the clutch CL due to the increase in the engine rotational speed, and the engine rotational speed will be excessively revved up due to the engagement of the clutch; therefore, there is the risk that discomfort will be imparted to the driver. In contrast, by maintaining the transmission ratio when switching from the HEV mode to the EV mode, a state in which the secondary rotational speed is higher than the output side rotational speed of the clutch CL can be transitioned to a full engagement state, and drag shock will not be generated in the driving wheels. That is, when the driver makes an acceleration request by depressing the accelerator pedal 19, the engine rotational speed will not excessively rev up, and the mode is switched to the HEV mode without generating drag shock. When downshifting the variator CVT is necessary when engaging the clutch CL, the required driving force requested by the driver can be achieved by engaging the clutch CL while downshifting with the transmission control.

(6-6) The controller starts the activation of the electric oil pump EO/P when one of the following conditions has been met: the line pressure of the hydraulic pressure circuit having the mechanical oil pump O/P as the hydraulic pressure source is less than a predetermined pressure; the discharge pressure of the mechanical oil pump O/P is less than a predetermined pressure; the rotational speed of the engine 1 is less than a predetermined rotational speed; or the rotational speed of the mechanical oil pump O/P is less than a predetermined rotational speed. The electric oil pump EO/P will thereby not be unnecessarily driven, and energy consumption can be suppressed.

(7-9) The controller stops the operation of the electric oil pump EO/P when one of the following conditions has been met: the line pressure of the hydraulic pressure circuit having the mechanical oil pump O/P as the hydraulic pressure source is equal to or greater than a predetermined pressure; the discharge pressure of the mechanical oil pump O/P is equal to or greater than a predetermined pressure; the rotational speed of the engine 1 is equal to or greater than a predetermined rotational speed; or the rotational speed of the mechanical oil pump O/P is equal to or greater than a predetermined rotational speed. The electric oil pump EO/P will thereby not be unnecessarily driven, and energy consumption can be suppressed. Additionally, since a deactivation command is output to the electric oil pump EO/P in a state in which hydraulic pressure is secured, the line pressure will not momentarily decline to zero, and a responsive transmission ratio control can be achieved.

(8-10) The method comprises a step S11 for prohibiting the activation of the electric oil pump EO/P when a predetermined condition has been met (electric oil pump activation prohibiting means or device); the controller is configured to prohibit the EV mode and select the HEV mode even in a driving state in which the EV mode should be selected if the activation of the electric oil pump EO/P is being prohibited. The EV mode will thereby not be switched to the HEV mode, and the hydraulic pressure will be constantly secured by the mechanical oil pump O/P, so that problems, such as not being able to obtain the activation of the electric oil pump EO/P and not being able to maintain the transmission ratio, can be prevented; as a result, drag shock, etc. will not be generated.

Embodiment 2

Figure 16:
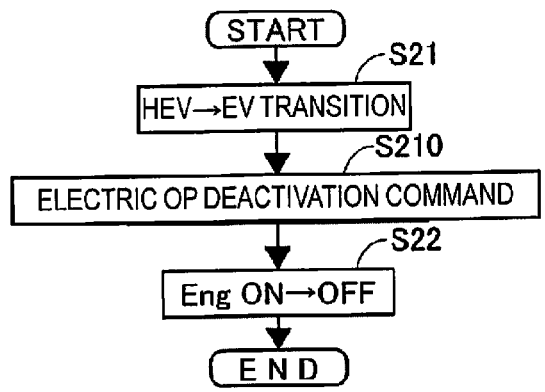
FIG. 16 is a flowchart representing the electric oil pump operation of a second embodiment.

The second embodiment will be described next. Since the basic configuration is the same as that of the first embodiment, only the differing points will be described. FIG. 16 is a flowchart representing the electric oil pump operation of the second embodiment. In the first embodiment, the actual hydraulic pressure state in the hydraulic pressure circuit was detected to determine when to start the activation of the electric oil pump EO/P. In contrast, the differing point in the second embodiment is that the activation of the electric oil pump EO/P is performed immediately when there is a transition request to switch from the HEV mode to the EV mode, as illustrated in step S210; then, the engine 1 is switched from ON to OFF in step S22. In other words, the electric oil pump EO/P is activated before stopping the engine 1.

Figure 17:
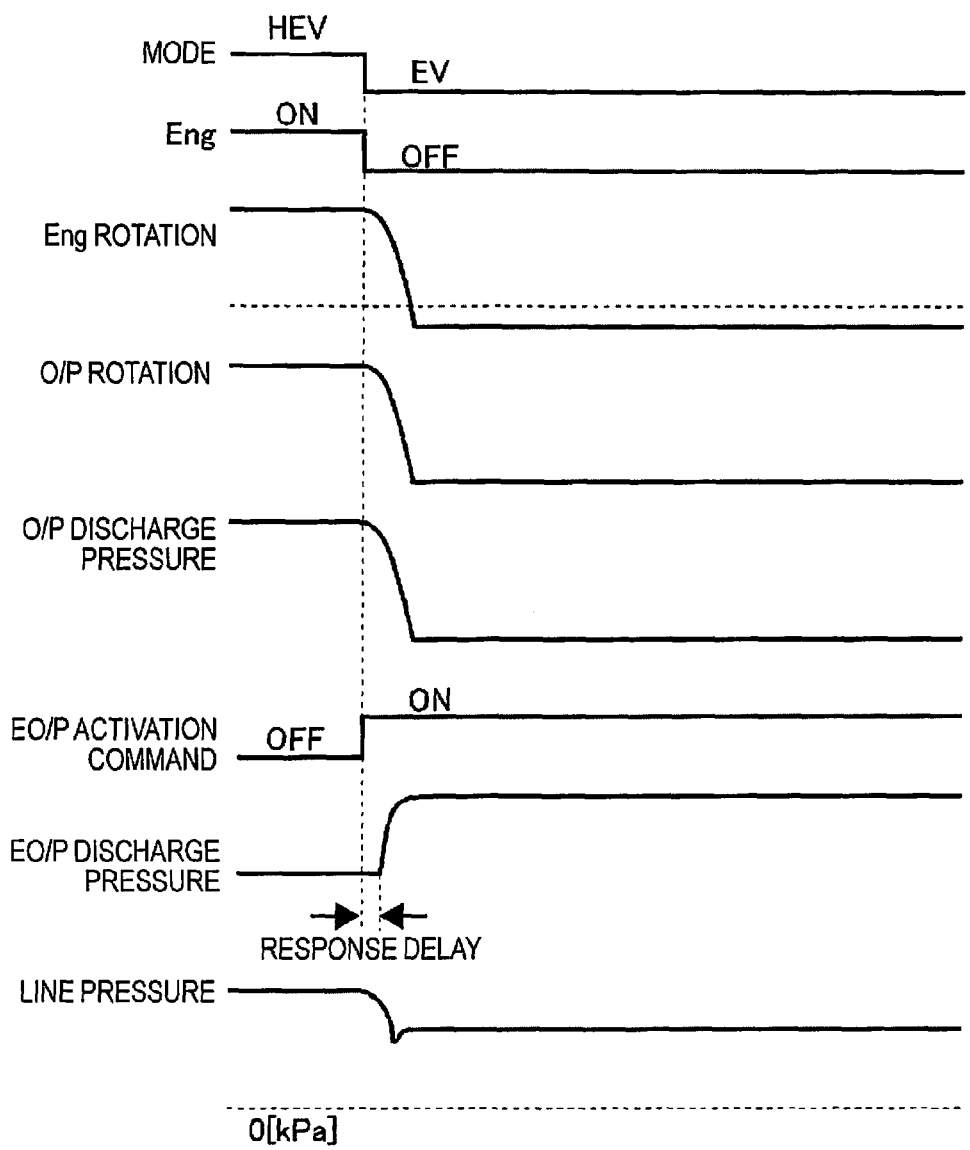
FIG. 17 is a time chart representing the electric oil pump operation of the second embodiment.

FIG. 17 is a time chart representing the electric oil pump operation of the second embodiment. With this, since the electric oil pump EO/P is activated before stopping the engine 1, a state in which the line pressure will greatly decrease can be avoided even if there is a response delay between the activation command and when the electric oil pump EO/P actually outputs the discharge pressure.

As described above, the effects listed below can be obtained with the second embodiment.

(9-7) The controller is configured to activate the electric oil pump EO/P when a switch command to switch from the HEV mode to the EV mode is output. Thus, since the activation of the electric oil pump EO/P can be started before the operation of the mechanical oil pump O/P is stopped, a situation in which the line pressure drops greatly can be avoided, and a stable transmission ratio control can be achieved.

Embodiment 3

Figure 18:
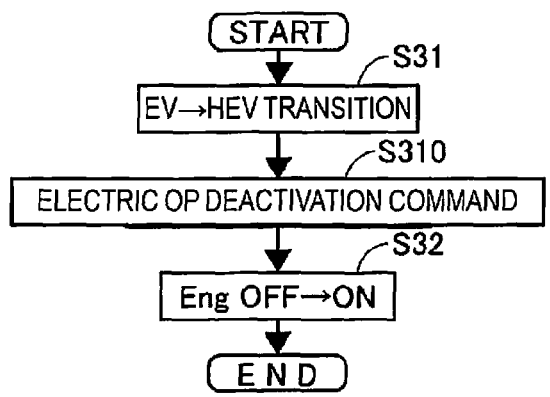
FIG. 18 is a flowchart representing the electric oil pump stopping operation of a third embodiment.

The third embodiment will be described next. Since the basic configuration is the same as that of the first embodiment, only the differing points will be described. FIG. 18 is a flowchart representing the electric oil pump stopping operation of the third embodiment. In the first embodiment, the actual hydraulic pressure state in the hydraulic pressure circuit was detected to determine when to stop the electric oil pump EO/P. In contrast, the differing point in the third embodiment is that a deactivation command of the electric oil pump EO/P is executed immediately when there is a transition request to switch from the EV mode to the HEV mode, as illustrated in step S310; then, the engine 1 is switched from OFF to ON in step S32. In other words, the electric oil pump EO/P is stopped before activating the engine 1.

Figure 19:
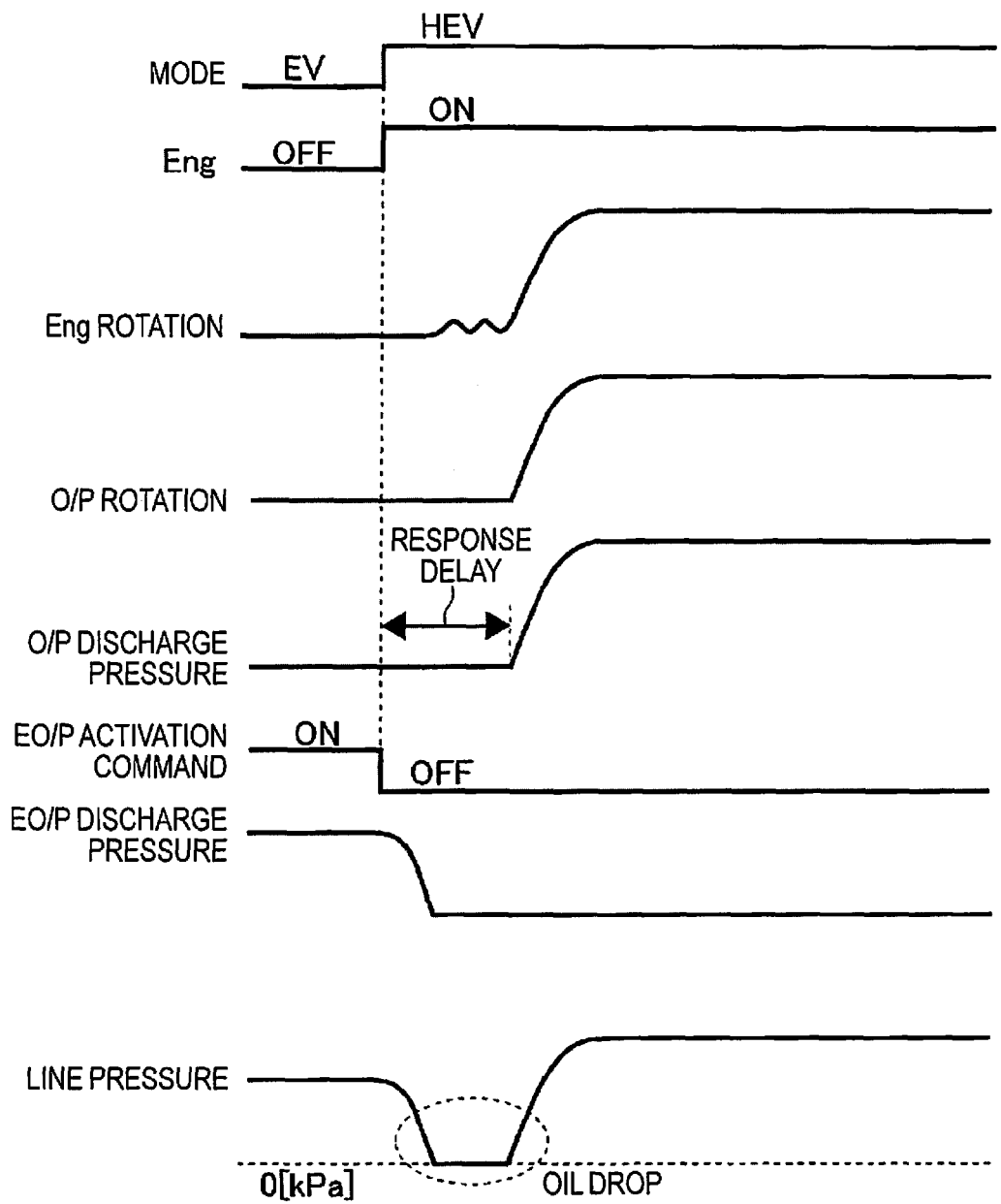
FIG. 19 is a time chart representing the electric oil pump stopping operation of the third embodiment.

FIG. 19 is a time chart representing the electric oil pump stopping operation of the third embodiment. With this, since the operation of the electric oil pump EO/P is stopped before activating the engine 1, even though there are situations in which the line pressure is decreased due to a delay in the engine start time or a delay in the generation of the discharge pressure of the mechanical oil pump O/P accompanying thereof, the electric oil pump EO/P can be quickly stopped, and energy consumption can be suppressed.

As described above, the effects listed below can be obtained with the third embodiment.

(10-8) The controller is configured to stop the electric oil pump EO/P when a switch command to switch from the EV mode to the HEV mode is output. Thus, the electric oil pump EO/P can be stopped in response to starting the operation of the mechanical oil pump O/P; as a result, unnecessary energy consumption can be suppressed.

Embodiment 4

Figure 20:
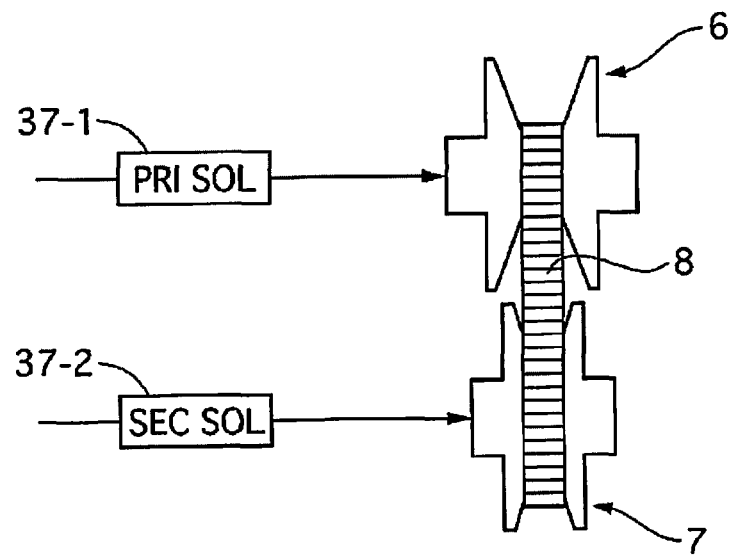
FIG. 20 is a schematic explanatory view showing the variator and a solenoid for performing hydraulic control in a fourth embodiment.

The fourth embodiment will be described next. Since the basic configuration is the same as that of the first embodiment, only the differing points will be described. FIG. 20 is a schematic explanatory view showing the variator and a solenoid for performing hydraulic control in the fourth embodiment. In the first embodiment, upon maintaining the transmission ratio of the variator CVT at a predetermined transmission ratio when the engine 1 is stopped and the mechanical oil pump O/P is stopped, the transmission ratio of the variator CVT is configured to be maintained by activating the electric oil pump EO/P and supplying hydraulic pressure to the piston oil chamber as a transmission ratio maintaining means or device. In contrast, in the fourth embodiment, upon maintaining the transmission ratio of the variator CVT at a predetermined transmission ratio when the engine 1 is stopped and the mechanical oil pump O/P is stopped, the transmission ratio is configured to be maintained by fully closing a primary pulley pressure solenoid 37-1 and a secondary pulley pressure solenoid 37-2 to seal the piston oil chambers of the primary pulley 6 and the primary pulley 7, as a transmission ratio maintaining means or device. The transmission ratio can thereby be maintained without comprising an electric oil pump EO/P, and thus, cost reduction can be achieved.

As described with reference to FIG. 6, a secondary spring SEC_SPR is disposed in the secondary pulley, and the tensile force thereof can be secured. Thus, the transmission ratio can be configured to be maintained by fully closing only the primary pulley pressure solenoid 37-1 so that the tensile force difference between the pulleys will be less than or equal to the transmission resistance (refer to the thick line in FIG. 6).

In the case that the primary pulley pressure solenoid 37-1 and the secondary pulley pressure solenoid 37-2 are hydraulic control valves of a type that cannot be fully closed, the piston hydraulic pressure can be configured to be sealed by separately adding a control valve that can be fully closed.

Embodiment 5

Figure 21:
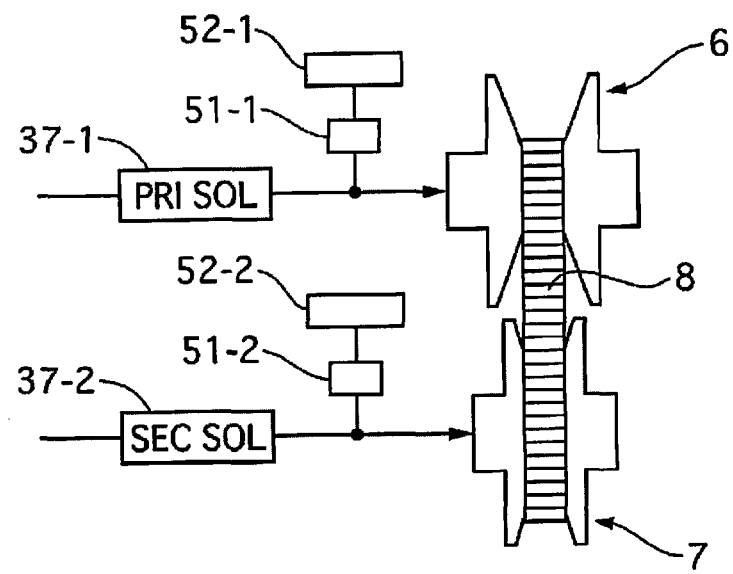
FIG. 21 is a schematic explanatory view showing the variator and a solenoid for performing hydraulic control in the fifth embodiment.

The fifth embodiment will be described next. Since the basic configuration is the same as that of the fourth embodiment, only the differing points will be described. FIG. 21 is a schematic explanatory view showing the variator and a solenoid for performing hydraulic control in the fifth embodiment. In the fourth embodiment, upon maintaining the transmission ratio of the variator CVT at a predetermined transmission ratio when the engine 1 is stopped and the mechanical oil pump O/P is stopped, the transmission ratio is configured to be maintained by fully closing the primary pulley pressure solenoid 37-1 and the secondary pulley pressure solenoid 37-2 to seal the piston oil chambers of the primary pulley 6 and the primary pulley 7, as a transmission ratio maintaining means or device. In contrast, the differing point in the fifth embodiment is that control valves 51-1, 52-1, which can be fully closed, and the accumulators 52-1, 52-2 are each individually disposed on the oil passage between the primary pulley pressure solenoid 37-1 and the primary pulley 6, as well as on the oil passage between the secondary pulley pressure solenoid 37-2 and the secondary pulley 7, as the transmission ratio maintaining means or device.

When traveling in the HEV mode, the control valves 51-1, 52-1 are controlled, and hydraulic pressure accumulates in the accumulators 52-1, 52-2. Then, when switching to the EV mode and upon maintaining the transmission ratio of the variator CVT at a predetermined transmission ratio when the engine 1 is stopped and the mechanical oil pump O/P is stopped, the primary pulley pressure solenoid 37-1 and the secondary pulley pressure solenoid 37-2 are fully closed to seal the piston oil chambers of the primary pulley 6 and the primary pulley 7; the control valves 51-1, 51-2 are opened to supply the hydraulic pressure accumulated in the accumulators 52-1, 52-2 to the piston oil chambers of the primary pulley 6 and the secondary pulley 7, as a transmission ratio maintaining means or device. Even if the seal is incomplete and there is oil leakage, the accumulators 52-1, 52-2 can thereby compensate for the leakage; as a result, the transmission ratio can be stably maintained at the predetermined transmission ratio.

Embodiment 6

Figure 22:
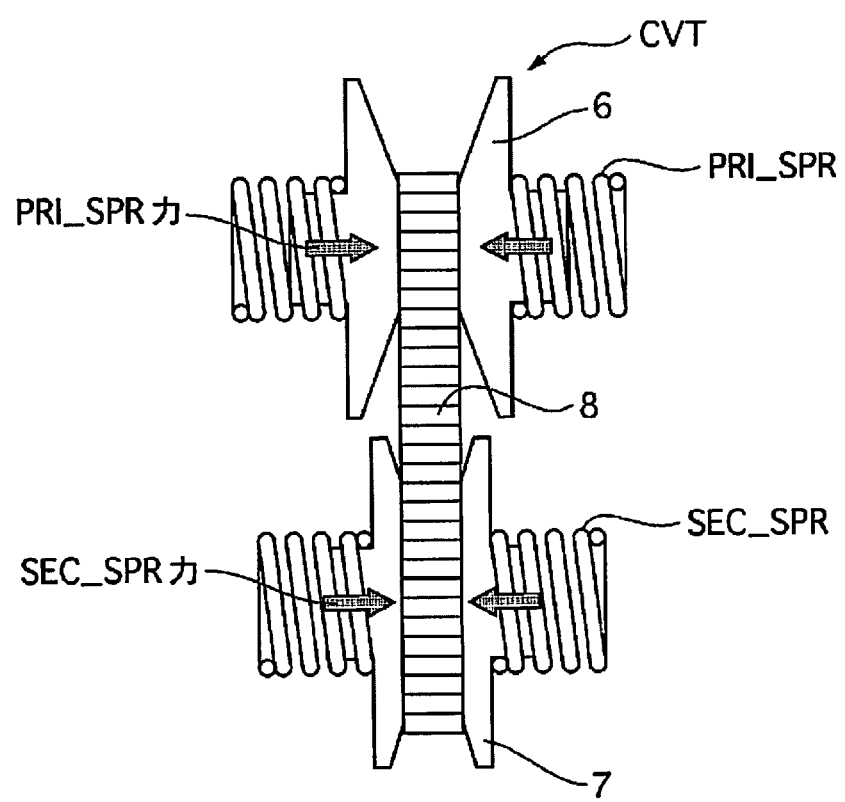
FIG. 22 is a schematic explanatory view showing the variator of a sixth embodiment.

The sixth embodiment will be described next. Since the basic configuration is the same as that of the first embodiment, only the differing points will be described. FIG. 22 is a schematic explanatory view showing the variator of the sixth embodiment. In the first embodiment, upon maintaining the transmission ratio of the variator CVT at a predetermined transmission ratio when the engine 1 is stopped and the mechanical oil pump O/P is stopped, the transmission ratio of the variator CVT is configured to be maintained by activating the electric oil pump EO/P as a transmission ratio maintaining means or device. In contrast, the sixth embodiment comprises not only a secondary spring SEC_SPR to generate thrust for the secondary pulley 7 but also a primary spring PRI_SPR to generate thrust for the primary pulley 6 as the transmission ratio maintaining means or device.

That is, as shown in FIG. 6, if a primary pulley thrust is generated so that the tensile force difference between the pulleys will be less than or equal to the transmission resistance Fr, the transmission ratio can be maintained by the transmission resistance Fr. Therefore, the tensile force fp of the primary spring PRI_SPR is set to be greater than the tensile force fs of the secondary spring SEC_SPR, and the tensile force of the primary spring PRI_SPR is set so that the absolute value of the tensile force difference (|fs−fp|) will be less than or equal to the transmission resistance Fr. The transmission ratio of the variator CVT can thereby be maintained at a predetermined transmission ratio via the spring force without activating a control valve, etc. when the engine 1 is stopped and the mechanical oil pump O/P is stopped.

Other Embodiments

The present invention was described above based on each embodiment, but the invention is not limited to the configurations described above; other configurations are included in the present invention. In the embodiments, the transmission ratio was configured to be maintained at a predetermined transmission ratio during the EV mode; however, a configuration can also be employed in which the discharge capacity of the electric oil pump is increased so that the transmission ratio is also changed according to the running state during the EV mode. In this case, shifting can be performed without rotating the variator CVT; if there is a case in which the variator CVT must be rotated, the variator CVT can be rotated by slip-engaging the clutch CL.

The embodiments described a configuration, in which the engine is restarted by a starter motor 3, but other configurations are also possible. Specifically, in recent years, a technology has been put into practical use, in which the alternator is replaced with a motor generator in a vehicle with an idling stop function, and an alternator function is added to this motor generator to add an engine starting function; as a result, when restarting the engine from an idling stop, restarting the engine is carried out by this motor generator rather than by the starter motor. The present invention may be configured so that restarting engine is carried out by a motor generator such as that described above.

In addition, in the embodiments, regarding the determinations in the mode map, the negative region of the vertical axis was determined based on the ON or the OFF of the brake switch 26, but the invention is not limited thereto; the determination can be based on an output value of a stroke sensor of the brake pedal 16, or the determination can be based on the output value of a brake fluid pressure sensor that detects the master cylinder pressure, etc.

Furthermore, in the embodiments, an example was described in which a secondary pulley pressure solenoid 37-2 is provided; however, the invention may be configured to not provide this secondary pulley pressure solenoid 37-2 and to directly supply the line pressure PL that has been regulated by the line pressure solenoid 35 to the secondary pulley 7. In this case, upon maintaining the transmission ratio at a predetermined transmission ratio in step S5 in FIG. 7, hydraulic pressure will also be supplied to the secondary pulley 7, accompanying the supply of hydraulic pressure to the primary pulley 6; however, in general, the pressure receiving area of the secondary pulley is set to be <the pressure receiving area of the primary pulley, so that, unless the discharge pressure of the electric oil pump EO/P is extremely large, the relationship of the tensile forces illustrated in FIG. 6 is valid (the magnitude relation of the tensile forces does not change) and so that the transmission ratio can be maintained at a predetermined transmission ratio in the same way as in the case in which hydraulic pressure is supplied only to the primary pulley 6.

The invention claimed is:
1. A hybrid vehicle, comprising:
an engine;
a continuously variable transmission;
a driving motor including a clutch configured to be released between the driving wheels and the continuously variable transmission when the driving motor is driving or, when subjected to regenerative braking;
an engine stopping device configured to stop the engine when the clutch is released;
a transmission ratio maintaining device configured to maintain the transmission ratio of the continuously variable transmission in conjunction with the engine stopping device, and maintain the transmission ratio while the engine is stopped; and
a mechanical oil pump configured to be driven by the engine, and supply hydraulic pressure to the continuously variable transmission, the transmission ratio maintaining device being configured to maintain the transmission ratio of the continuously variable transmission when the engine stopping device is stopping the engine by supplying hydraulic pressure to the continuously variable transmission via an electric oil pump that is driven by an electric motor.

2. The hybrid vehicle according to claim 1, wherein
the continuously variable transmission comprises a primary pulley, a secondary pulley, an endless flexible member bridging the two pulleys, and an elastic body configured to generate a clamping force of the secondary pulley, and
the transmission ratio maintaining device is configured to maintain the transmission ratio by supplying a constant pressure to the primary pulley.

3. The hybrid vehicle according to claim 2, wherein
the transmission ratio maintaining device is configured to supply the constant pressure so that the absolute value of the difference between a secondary tensile force generated in the endless flexible member by the elastic body and a primary tensile force generated in the endless flexible member by the constant pressure will be less than a resistance tensile force that is generated by a sliding resistance that is generated between the endless flexible member and each pulley.

4. The hybrid vehicle according to claim 1, wherein
when stopping the vehicle while the engine is stopped, the transmission ratio maintaining device is configured to continue maintenance of the maintained transmission ratio while stopped.

5. The hybrid vehicle according to claim 1, wherein
the electric oil pump is configured to be started when one of the following conditions has been met: a line pressure of a hydraulic pressure circuit having the mechanical oil pump as a hydraulic pressure source is less than a predetermined pressure; a discharge pressure of the mechanical oil pump is less than a predetermined pressure; a rotational speed of the engine is less than a predetermined rotational speed; or a rotational speed of the mechanical oil pump is less than a predetermined rotational speed.

6. The hybrid vehicle according to claim 1, wherein
the electric oil pump is configured to be activated when a mode switch command is output to switch from a hybrid traveling mode for traveling with the engine to an electric traveling mode in which the engine is stopped and the driving motor drives or, when subjected to regenerative braking.

7. The hybrid vehicle according to claim 6, further comprising
a control device configured to stop operation of the electric oil pump when a switch command to switch from the electric traveling mode to the hybrid traveling mode is output.

8. The hybrid vehicle according to claim 1, wherein
the electric oil pump is configured to be stopped when one of the following conditions has been met: the line pressure of the hydraulic pressure circuit having the mechanical oil pump as the hydraulic pressure source is equal to or greater than a predetermined pressure; the discharge pressure of the mechanical oil pump is equal to or greater than a predetermined pressure; the rotational speed of the engine is equal to or greater than a predetermined rotational speed; or the rotational speed of the mechanical oil pump is equal to or greater than a predetermined rotational speed.

9. The hybrid vehicle according to claim 1, further comprising
an electric oil pump activation prohibiting device configured to prohibit the activation of the electric oil pump when a predetermined condition has been met,
the electric traveling mode is prohibited and the hybrid traveling mode for traveling with the engine is selected, in a driving state in which the electric traveling mode, in which the engine is stopped and the driving motor is driving, or when subjected to regenerative braking, when the activation of the electric oil pump is prohibited.

10. The hybrid vehicle according to claim 2, wherein
when stopping the vehicle while the engine is stopped, the transmission ratio maintaining device is configured to continue maintenance of the maintained transmission ratio while stopped.

11. The hybrid vehicle according to claim 3, wherein
when stopping the vehicle while the engine is stopped, the transmission ratio maintaining device is configured to continue maintenance of the maintained transmission ratio while stopped.

12. The hybrid vehicle according to claim 2, wherein
the electric oil pump is configured to be started when one of the following conditions has been met: a line pressure of a hydraulic pressure circuit having the mechanical oil pump as a hydraulic pressure source is less than a predetermined pressure; a discharge pressure of the mechanical oil pump is less than a predetermined pressure; a rotational speed of the engine is less than a predetermined rotational speed; or a rotational speed of the mechanical oil pump is less than a predetermined rotational speed.

13. The hybrid vehicle according to claim 3, wherein
the electric oil pump is configured to be started when one of the following conditions has been met: a line pressure of a hydraulic pressure circuit having the mechanical oil pump as a hydraulic pressure source is less than a predetermined pressure; a discharge pressure of the mechanical oil pump is less than a predetermined pressure; a rotational speed of the engine is less than a predetermined rotational speed; or a rotational speed of the mechanical oil pump is less than a predetermined rotational speed.

14. The hybrid vehicle according to claim 4, wherein
the electric oil pump is configured to be started when one of the following conditions has been met: a line pressure of a hydraulic pressure circuit having the mechanical oil pump as a hydraulic pressure source is less than a predetermined pressure; a discharge pressure of the mechanical oil pump is less than a predetermined pressure; a rotational speed of the engine is less than a predetermined rotational speed; or a rotational speed of the mechanical oil pump is less than a predetermined rotational speed.

15. The hybrid vehicle according to claim 2, wherein
the electric oil pump is configured to be activated when a mode switch command is output to switch from a hybrid traveling mode for traveling with the engine to an electric traveling mode in which the engine is stopped and the driving motor drives or, when subjected to regenerative braking.

16. The hybrid vehicle according to claim 3, wherein
the electric oil pump is configured to be activated when a mode switch command is output to switch from a hybrid traveling mode for traveling with the engine to an electric traveling mode in which the engine is stopped and the driving motor drives or, when subjected to regenerative braking.

17. The hybrid vehicle according to claim 4, wherein the electric oil pump is configured to be activated when a mode switch command is output to switch from a hybrid traveling mode for traveling with the engine to an electric traveling mode in which the engine is stopped and the driving motor drives or, when subjected to regenerative braking.

18. The hybrid vehicle according to claim 5, wherein the electric oil pump is configured to be activated when a mode switch command is output to switch from a hybrid traveling mode for traveling with the engine to an electric traveling mode in which the engine is stopped and the driving motor drives or, when subjected to regenerative braking.

19. The hybrid vehicle according to claim 6, wherein the electric oil pump is configured to be stopped when one of the following conditions has been met: the line pressure of the hydraulic pressure circuit having the mechanical oil pump as the hydraulic pressure source is equal to or greater than a predetermined pressure; the discharge pressure of the mechanical oil pump is equal to or greater than a predetermined pressure; the rotational speed of the engine is equal to or greater than a predetermined rotational speed; or the rotational speed of the mechanical oil pump is equal to or greater than a predetermined rotational speed.

* * * * *